United States Patent
Asokan et al.

(10) Patent No.: US 6,633,559 B1
(45) Date of Patent: Oct. 14, 2003

(54) APPARATUS AND METHODS FOR EXTENDED BASE STATION RANGE USING STAGGERED UPLINK FRAME STRUCTURES

(75) Inventors: Ramanathan Asokan, Cary, NC (US); Alex Krister Raith, Durham, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/372,015

(22) Filed: Aug. 11, 1999

(51) Int. Cl.⁷ .................................................. H04J 3/06
(52) U.S. Cl. ..................... 370/350; 370/335; 370/347; 370/337; 370/252; 370/150; 370/503; 455/67.1; 455/561; 455/502; 455/91; 455/515; 455/449
(58) Field of Search .................. 455/67.1, 561, 455/502, 91, 515, 449; 370/350, 335, 337, 252, 150, 347, 503

(56) References Cited

U.S. PATENT DOCUMENTS

| | | | |
|---|---|---|---|
| 5,483,537 A | | 1/1996 | Dupuy ........................ 370/95.3 |
| 5,615,215 A | * | 3/1997 | Utting et al. ................ 370/337 |
| 5,839,071 A | | 11/1998 | Johnson ........................ 455/440 |
| 6,169,887 B1 | * | 1/2001 | Cordell et al. ............ 455/242.2 |
| 6,192,247 B1 | * | 2/2001 | Dillon et al. ................ 455/446 |
| 6,212,405 B1 | * | 4/2001 | Jiang et al. .................. 455/561 |
| 6,304,759 B1 | * | 10/2001 | Jiang et al. .................. 455/502 |
| 6,363,261 B1 | * | 3/2002 | Raghavan .................... 455/561 |
| 6,370,128 B1 | * | 4/2002 | Raitola ........................ 370/329 |
| 6,370,397 B1 | * | 4/2002 | Popovic et al. ............. 455/561 |
| 6,373,833 B1 | * | 4/2002 | Suonvieri et al. ............ 370/347 |
| 6,424,633 B1 | * | 7/2002 | von Brandt .................. 370/280 |

FOREIGN PATENT DOCUMENTS

| | | |
|---|---|---|
| EP | 0 564 429 A2 | 10/1993 |
| EP | 0 687 079 A2 | 12/1995 |

OTHER PUBLICATIONS

"The Issue of GSM/EDGE/GPRS–136HS Time Alignment for Large/Rural Cells with Extra Long Propagation Delay," UWCC.GTF.PDFG/99.03.09, Flamingo Hilton, Reno, NV, Mar. 9–11, 1999, 3 pages.
International Search Report, PCT/US00/20927, Jan. 9, 2001.

* cited by examiner

Primary Examiner—William Trost
Assistant Examiner—Danh C Le
(74) Attorney, Agent, or Firm—Myers Bigel Sibley & Sajovec

(57) ABSTRACT

A first group of terminals at a first range from base station is instructed, e.g., by transmitted timing advance values, to time their transmissions to arrive at a base station in synchronism with a first series of frames. A second group of terminals at a second range is instructed to time their transmissions to arrive at the base station in synchronism with a second series of frames that is time-offset with respect to the first series of frames. Transmissions from the first and second groups of terminals are, received at the base station in synchronism with the respective first and second series of frames. The transmissions from respective first and second groups may be received on respective separate carrier frequencies, or may be multiplexed on a common carrier frequency. According to another aspect, first timing information is transmitted by a base station to a terminal when the terminal is in a first range, and second timing information is transmitted to the terminal when the terminal is in a second range, the first and second timing information instructing the terminal to time its transmissions to arrive at the base station synchronized with one of first or second time-offset series of frames. The ranges may overlap, and the hysteresis may be provided in instructing the terminal to synchronize its transmissions to one of the first series of frames or the second series of frames when the terminal moves between the first and second ranges. Related wireless communications apparatus is discussed.

38 Claims, 16 Drawing Sheets

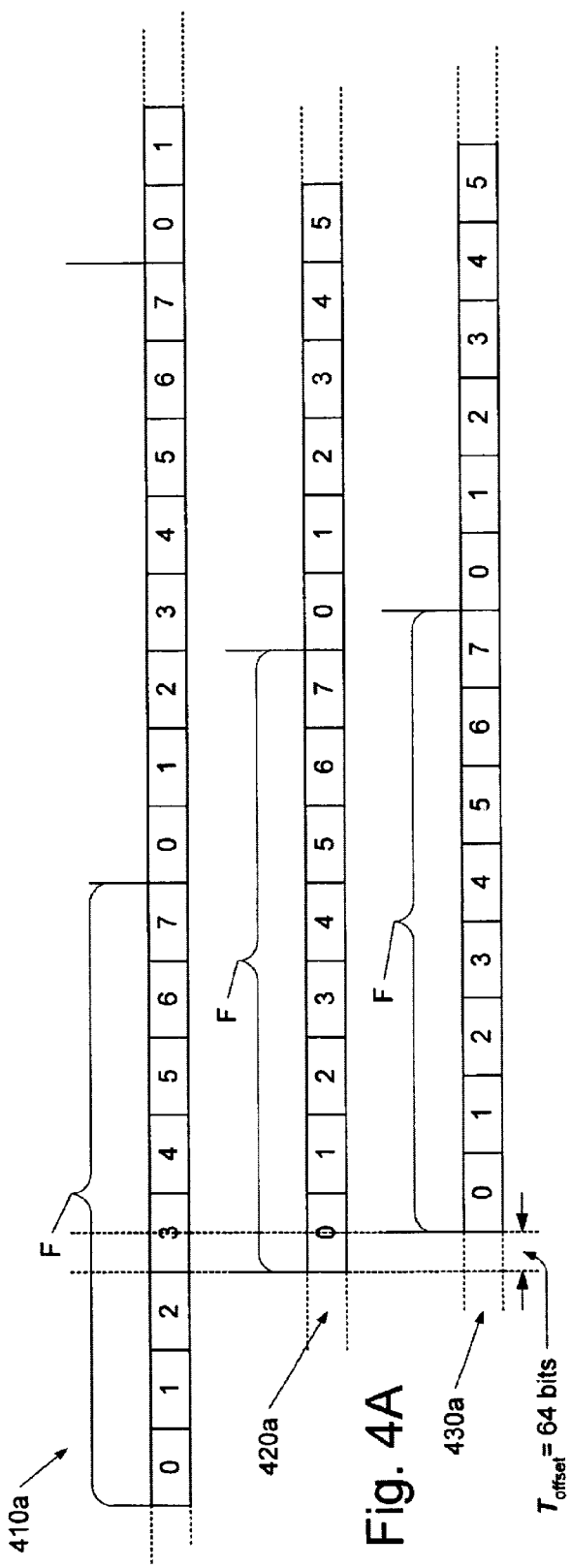
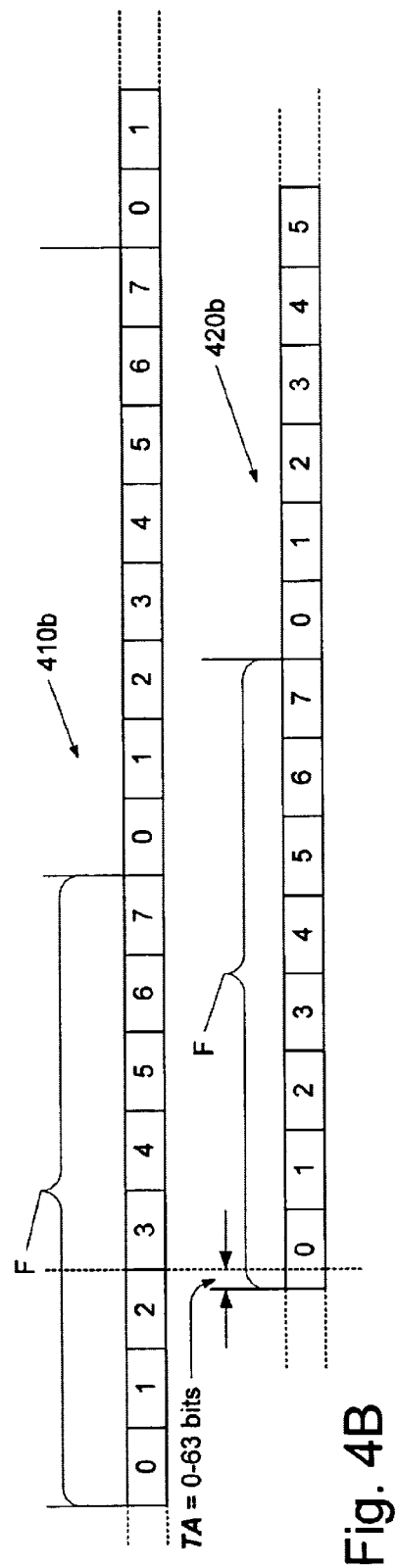
Fig. 4A
Fig. 4B

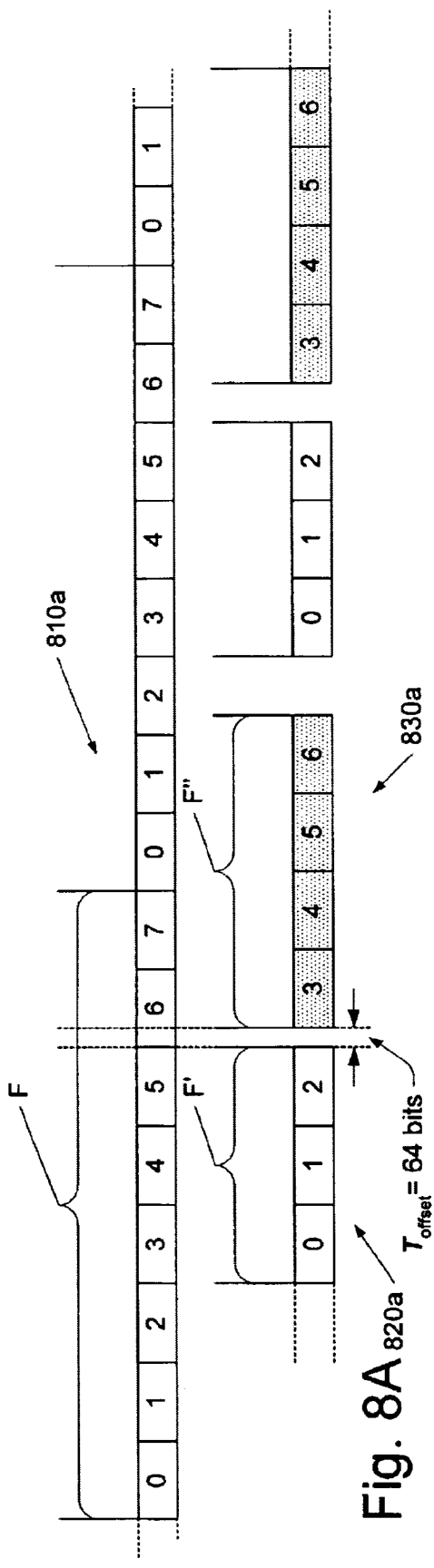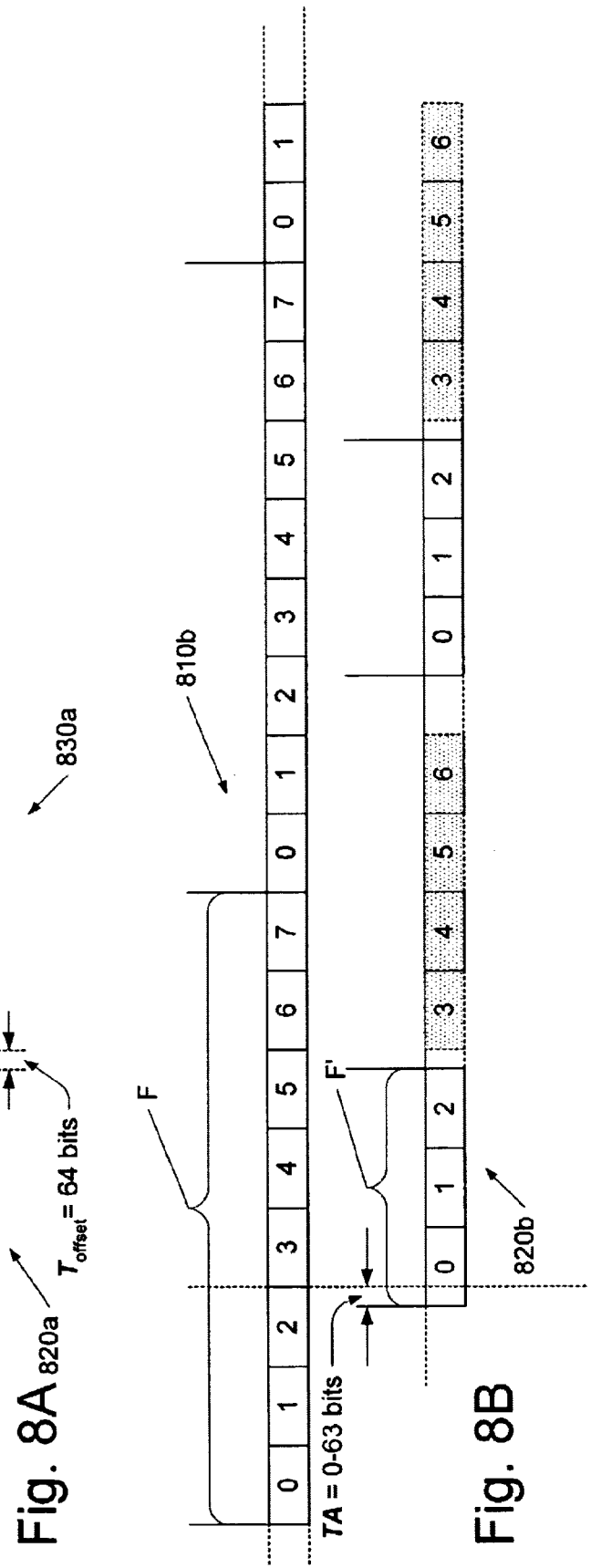

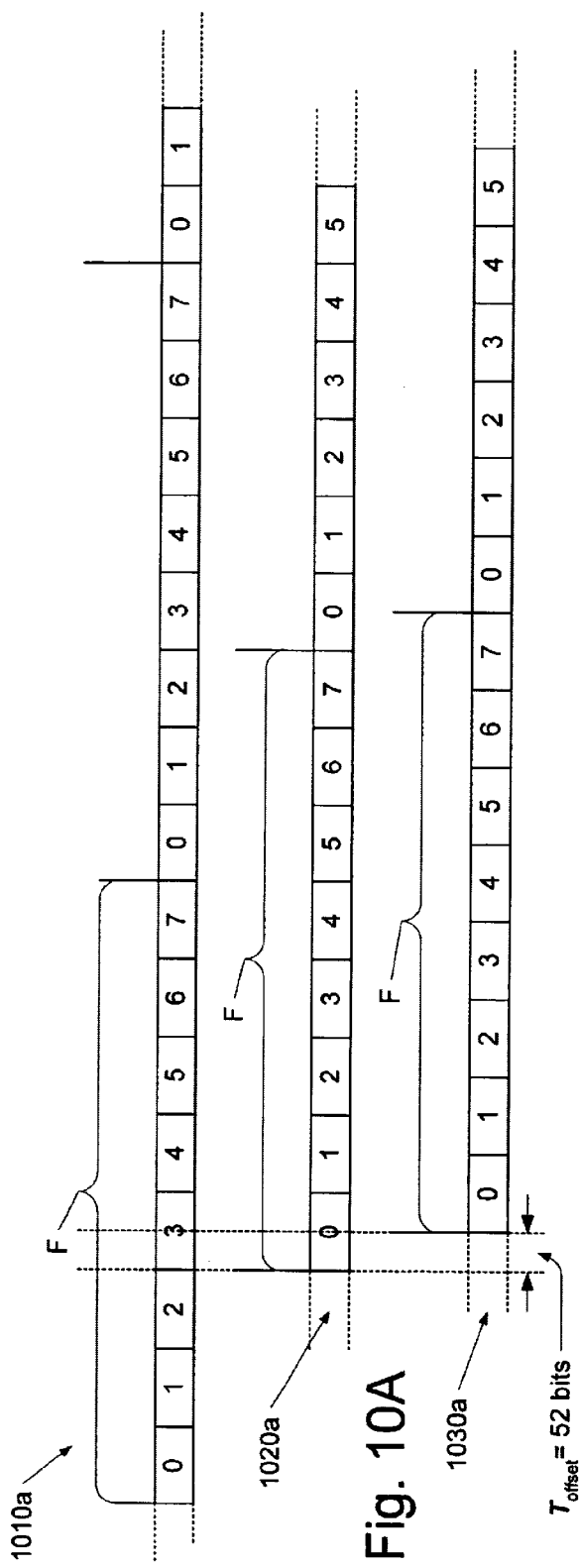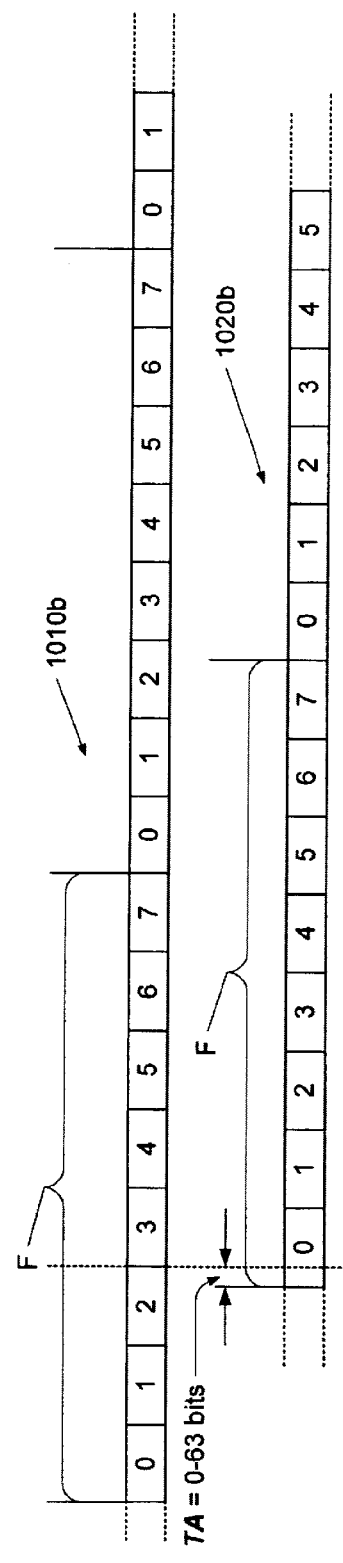
Fig. 10A
Fig. 10B

APPARATUS AND METHODS FOR EXTENDED BASE STATION RANGE USING STAGGERED UPLINK FRAME STRUCTURES

FIELD OF THE INVENTION

The present invention relates to wireless communications systems and methods, and more particularly, to apparatus and methods for increasing range in wireless communications systems.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 (superseded by IS-136) and the European standard GSM (Global System for Mobile Communications) have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular communication system 20. The cellular system 20 may include one or more terminals 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of terminals.

The cells 24 generally serve as nodes in the communication system 20, from which links are established between terminals 22 and the MISO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two terminals 22 or between a terminal 22 and a landline telephone user 32 through a public switched telephone network (PSTN) 34. The function of a base station 26 is to handle radio communication between a cell 24 and terminals 22. In this capacity, a base station 26 functions as a relay station for data and voice signals.

Those skilled in the art will appreciate that "cells" may have configurations other than the omnidirectional cells 24 illustrated in FIG. 1. For example, the coverage areas conceptually illustrated as a hexagonally-shaped area served by a base station 26 may actually be subdivided into three sectors using separate directional antennas mounted at the base station 26, with the sector antenna having patterns extending in three different directions. Each of these sectors may itself be considered a "cell" As will be appreciated by those skilled in the art, other cell configurations are also possible, including, for example, overlaid cells, microcells, picocells and the like.

Cell size in time-division multiplexed communications systems is typically limited by the effect of propagation delays on synchronizing the arrival of transmissions from variously located terminals to the slotted frame structures used by base station transceivers. In order to synchronize transmissions from terminals located in a cell, the base station terminal typically transmits a respective timing advance value (TA) to a respective terminal. The terminal advances its transmissions to the base station according to the timing advance value to compensate for the propagation delay between the terminal and the base station. Typically, the timing advance values instruct the terminals to advance their uplink transmissions such that the transmissions from all the terminals served by a base station arrive at the base station in synchronism with a common receive frame structure.

When a terminal attempts to access a system, however, such propagation delay information typically is unavailable. Accordingly, conventional time-division-multiplexed systems commonly utilize a random access channel (RACH) to receive an access request burst from such an unsynchronized terminal and use propagation delay gained from the received RACH burst to determine an appropriate timing advance for the terminal. Upon powering up or handoff to a new base station, an unsynchronized terminal searches for and receives a control channel from the base station that provides an initial timing reference. To initiate use of the base station, the terminal then transmits a RACH burst at a predetermined time in relation to the control channel timing reference. Upon receipt of the RACH burst, the base station can determine round-trip time delay based on the delay between the transmission of the control channel timing reference and the receipt of the RACH burst. The base station uses this round-trip time delay to determine an appropriate timing advance for the terminal.

The RACH typically is a slotted channel that is designed to tolerate significant variation in RACH burst timing. Each RACH slot typically includes a significant amount of "guard time" so that RACH bursts in adjacent slots are less likely to overlap. The amount of guard time provided typically limits maximum cell size, as the amount of guard time determines the maximum delay variation in RACH bursts that can be received by a base station.

For example, in systems conforming to the GSM recommendations, cell size is typically limited by: (1) the number of guard bits (68.25) provided in slots assigned to a RACH logical channel for random access bursts; (2) the number of bits (6) allotted to the timing advance message field in slow associated control channel (SACCH); and (3) synthesizer switching time required between receipt and transmit bursts at terminals operating in half-duplex mode. RACH bursts are used by terminals to achieve access, e.g., at handoff or initial access, and typically have relatively long guard periods (68.25 bits or 252 $\mu$secs). Using an 8.25 bit guard time, the remaining 60.0 bit period (221.5 $\mu$sec) of a slot is available for roundtrip time estimation. The roundtrip delay between a terminals and a base station should be within 221.5 $\mu$sec; otherwise, a RACH bust may overlap and/or collide with the next time slot. The maximum of 221.5 $\mu$sec roundtrip delay thus generally provides for a maximum cell radius of 33.2 km. For cells larger than 33.2 km distance, a RACH burst may collide with the next slot burst, and thus may not allow the base station to estimate the correct roundtrip delay and decode the RACH burst.

Once a connection has been established between a terminal and a base station in a GSM system, the base station continues to measure the time offset between its own burst schedule and bursts received from the terminal. Based on these measurements, the base station periodically provides the terminal with timing advance information in the form of a 6-bit timing advance value (TA) transmitted on the slow associated control channel (SACCH) at a rate of twice per second. The base station estimates round-trip delay on the random-access channel (RACH) on the common control channel (CCCH), and uses this estimated round-trip delay to determine the appropriate timing advance value to send to the terminal. Typically the timing advance value sent by the base station corresponds to the absolute delay between the base station and the terminal in terms of the number of bit periods, such that the 6-bit timing advance value provides a range of from 0 bit periods to 63 bit periods of advance, with a resolution of 1 bit period.

Referring to FIGS. 2A and 2B, the uplink frame in GSM is typically delayed by 3 slot periods with respect to the downlink frame (GSM slots have a length of 577 $\mu$sec, and include 156.25 bit periods). A terminal is typically assigned a slot pair, i.e., a single slot in each of the frames of the downlink and uplink carrier frequencies. Assuming an upper bound on propagation delay, the time separation between the downlink and uplink slots allows the terminal to use a simple half-duplex mode of radio operation wherein the terminal switches between receiving and transmitting on the two different carrier frequencies. A terminal assigned a maximum 63 bits of timing advance and operating in half-duplex mode typically has about 1½ slots for frequency synthesizer switching from receive to transmit.

If there is no delay, the base stations sends a timing advance value TA=0, and the terminal transmits to the base station using a transmit frame structure that lags its receive frame structure by 468.75 bits (3 slot periods). At the maximum delay that can be compensated for by the 6-bit timing advance value TA in the SACCH field, the base station commands a timing advance TA=63, and the terminal transmits using a transmit frame structure that lags its receive frame structure by 405.75 bits. In such a system, with the maximum of 63 bit periods of timing advance, the roundtrip delay between the terminal and the base station is limited to 233 $\mu$secs, giving a maximum distance of 34.9 km.

As described above, the extended guard time need for RACH bursts, along with the limits on the timing advance field in SACCH message and terminal synthesizer switching time limitations, typically limit cell size in GSM to approximately 35 km. Similar limitations typically are also present in other time-division multiplexed systems. Although conventional cell sizes may be sufficient for many if not most applications, there are many applications in which larger cell sizes may be advantageous. For example, in rural areas having low-density user populations, larger cells may reduce the number of base stations needed to cover a region, and thus lower capital and operating costs. Similarly, large cells may be advantageously used for long, straight highways and similar applications in which users in a large area are constrained to relatively small portion that extends significantly in only one direction. Larger cells may also be useful in locations where physical geography limits the number of acceptable base station sites, such as in coastal areas.

One proposed approach for increasing cell size involves restricting assignment of users to every other slot of the receive frame structure, such that the unused slots provide additional guard time to compensate for increased propagation delay. Unfortunately, such an approach can significantly reduce system capacity. This inefficiency may be particularly significant when only a relatively small number of users are located at a significant distance from a base station.

Another approach to increasing cell size in GSM systems is to transmit relative timing advance values to terminals instead of absolute timing advance values. According to such an approach, the timing advance value sent by a base station is interpreted as an increment or decrement by which a terminal is to increase or decrease its timing advance. Applied to a GSM system, for example, the 6 bits provided for the TA value in the SACCH message is large enough to support much larger cell sizes if used to communicate relative timing advance values. However, for terminals utilizing a half-duplex mode of operation, this scheme generally is limited by minimum synthesizer switching time, i.e., the transmit frames of the terminal cannot be advanced to the point that the terminal has insufficient time to switch between the receive and transmit frequencies. Faster synthesizer switching time may be achieved, but typically with a significant increase in the cost of terminals. In addition, using a relative timing advance does not address limitations to the guard times provided in the RACH, and may require modification of the existing air interface standard and terminal hardware.

SUMMARY OF THE INVENTION

In light of the foregoing, it is an object of the present invention to provide wireless communications apparatus and methods that can provide increased range.

It is another object of the present invention to provide wireless communications apparatus and methods that can provide increased range using existing terminals and air interfaces.

These and other objects, features and advantages are provided according to the present invention by wireless communications apparatus and methods in which respective groups of terminals, e.g., respective groups of terminals at respective different ranges with respect to a base station, are instructed to time their transmissions to arrive at the base station in synchronism with respective time-offset frame structures. Transmissions from respective groups may be transmitted on respective uplink carrier frequencies, synchronized to respective time-offset series of frames. Transmissions from respective groups may also be transmitted on a common uplink carrier frequency, and received in synchronism with respective frame series that are time-multiplexed on the common uplink carrier frequency. According to another aspect of the invention, overlapping ranges may be defined, such that hysteresis in switching between frame structures may be provided when a terminal moves between the ranges.

By providing staggered frame structures, the present invention allows the use of larger cell sizes. Transmissions from distant terminals may be received at a base station in synchronism with frame structures that are delayed with respect to the frame structures used to receive transmissions from less distant terminals, obviating the need to use large timing advances for the more distant terminals. This staggered approach obviates the need for faster synthesizer switching times, and allows for the use of existing terminals and air interfaces. As the transmissions from the groups are separated in either time or frequency, collisions between signals may be avoided.

In particular, according to an embodiment of the present invention, a first group of terminals is instructed to time their transmissions to arrive at a base station in synchronism with a first series of frames. A second group of terminals is instructed to time their transmissions to arrive at the base station in synchronism with a second series of frames that is time-offset with respect to the first series of frames. Preferably, he first group of terminals is located at a first range with respect to the base station, and the second group of terminals is located at a second range with respect to the base station. Transmissions from the first and second groups of terminals are received at the base station in synchronism with the respective first and second series of frames. The transmissions from respective first and second groups may be received on respective separate carrier frequencies, or the first and second series of frames may be multiplexed on a common carrier frequency.

In one embodiment of the presentation invention, first timing information is transmitted from the base station, instructing a terminal of the first group to time its transmissions to arrive at the base station in synchronism with the first series of frames. Second timing information is transmitted from the base station, instructing a terminal of the second group to time its transmissions to arrive at the base station in synchronism with the second series of frames. The transmitted timing information may include a timing advance value that is determined based on a propagation delay between a terminal and the base station. The propagation delay may be determined from timing of a random access channel (RACH) burst.

According to another aspect of the present invention, first timing information is transmitted by a base station to a terminal when the terminal is in a first range, the first timing information instructing the terminal to time its transmissions to arrive at the base station synchronized to a first series of frames. The base station transmits second timing information to the terminal when the terminal is in a second range, the second timing information instructing the terminal to time its transmissions to arrive at the base station synchronized with a second series of frames that is time-offset with respect to the first series of frames. The ranges may overlap, and hysteresis may be provided in instructing the terminal to synchronize its transmissions to one of the first series of frames or the second series of frames when the terminal moves between the first and second ranges.

According to another aspect of the present invention, an apparatus in a time-division multiplexed wireless communications system includes means for instructing a first group of terminals to time their transmissions to arrive at a base station in synchronism with a first series of frames, and means for instructing a second group of terminals to time their transmissions to arrive at the base station in synchronism with a second series of frames that is time-offset with respect to the first series of frames. The apparatus further includes means for receiving transmissions from the first and second groups of terminals at the base station in synchronism with the respective first and second series of frames.

In another embodiment of the present invention, a base station for a time-division multiplexed wireless communications system includes means for transmitting first timing information to a terminal when the terminal is in a first range with respect to a base station, the first timing information instructing the terminal to time its transmissions to arrive at the base station synchronized to a first series of frames, and means for transmitting second timing information to the terminal when the terminal is in a second range, the second timing information instructing the terminal to time its transmissions to arrive at the base station synchronized with a second series of frames that is time-offset with respect to the first series of frames. The base station may further include means for receiving a transmission from the terminal in synchronism with the first series of frames on a first carrier frequency, and means for receiving a transmission from the terminal in synchronism with the second series of frames on a second carrier frequency. Alternatively, the base station may include means for receiving a transmission from the terminal in synchronism with one of the first and second series of frames on a common carrier frequency.

In yet another embodiment according to the present invention, a wireless communications apparatus includes a base station operative to transmit first timing information that instructs a first group of terminals to time their transmissions to arrive at a base station in synchronism with a first series of frames, and to transmit second timing information that instructs a second group of terminals to time their transmissions to arrive at the base station in synchronism with a second series of frames that is time-offset with respect to the first series of frames. The base station is further operative to receive transmissions from the first and second groups of terminals in synchronism with the respective first and second series of frames.

The bases station also may be operative to transmit first timing information to a terminal when the terminal is in a first range with respect to a base station, the first timing information instructing the terminal to time its transmissions to arrive at the base station synchronized to a first series of frames, and to transmit second timing information to the terminal when the terminal is in a second range, the second timing information instructing the terminal to time its transmissions to arrive at the base station synchronized with a second series of frames that is time-offset with respect to the first series of frames. The first and second ranges may overlap and the base station may provide hysteresis in instructing the terminal to synchronize its transmissions to one of the first series of frames or the second series of frames when the terminal moves between the first and second ranges.

BRIEF DESCRIPTION OF THE DRAWINGS

FIGS. 4A–4B are timing diagrams illustrating exemplary downlink and uplink frame structures used in a wireless communications system according to an embodiment of the present invention.

FIGS. 8A–8B are timing diagrams illustrating exemplary downlink and uplink frame structures used in a wireless communications system according to another embodiment of the present invention.

FIGS. 10A–10B are timing diagrams illustrating exemplary downlink and uplink frame structures used in a wireless communications system according to another embodiment of the present invention.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
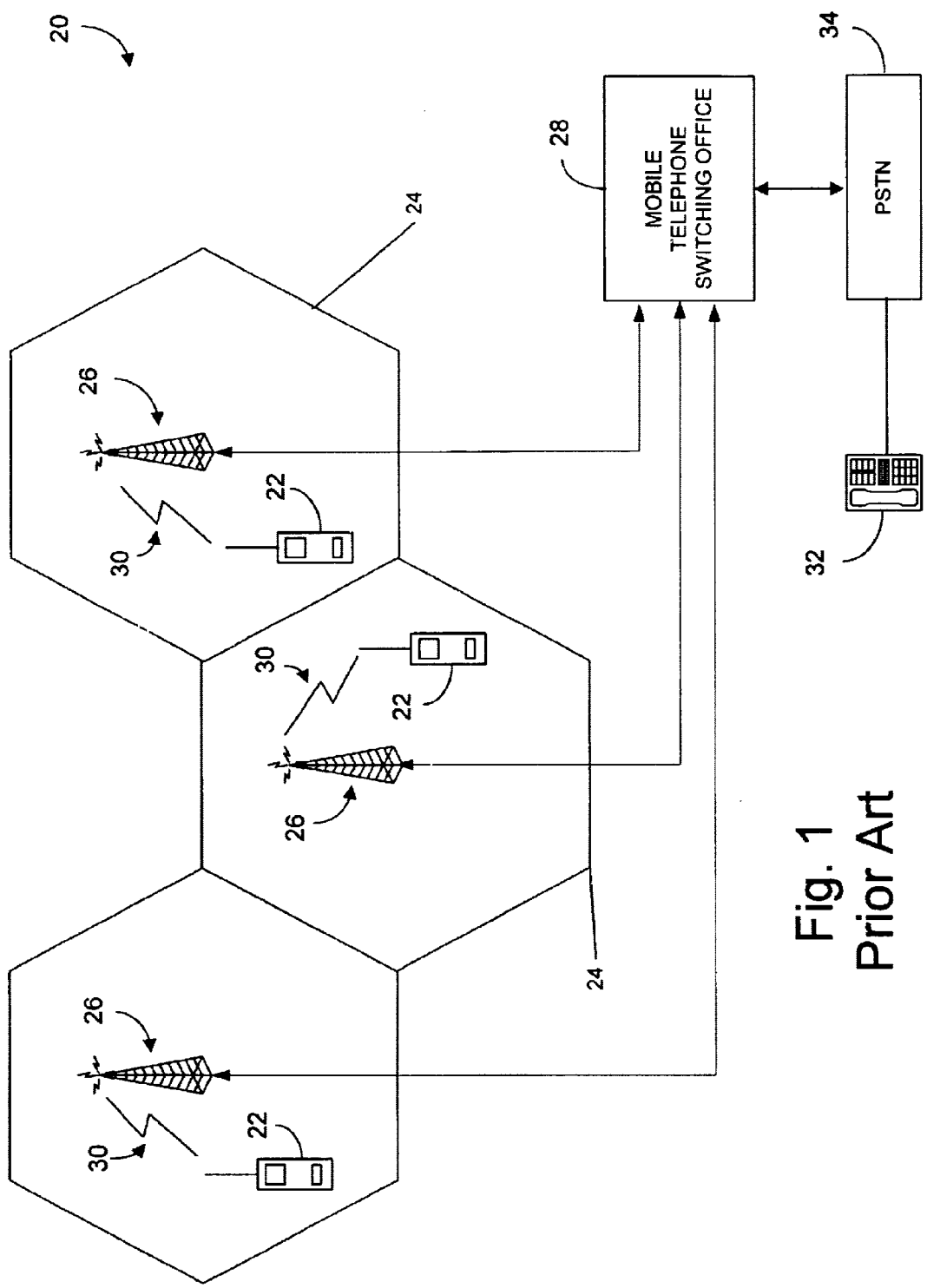
FIG. 1 is a schematic diagram illustrating a wireless communications system according to the prior art.
Figure 2A:
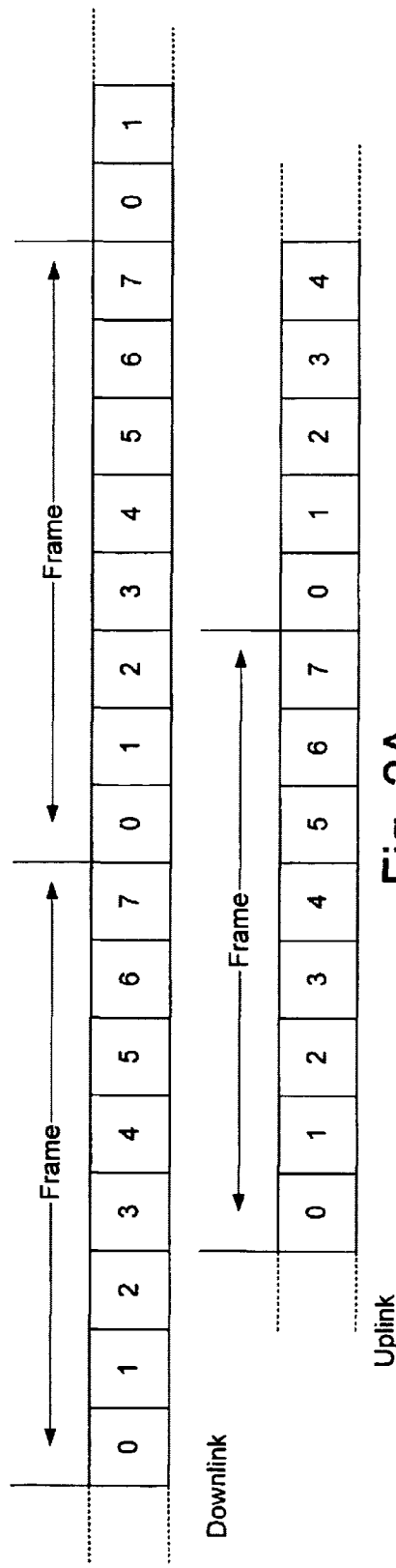
FIGS. 2A–2B are timing diagrams illustrating uplink and downlink frame structures used in a wireless communications system according to the prior art.
Figure 2B:
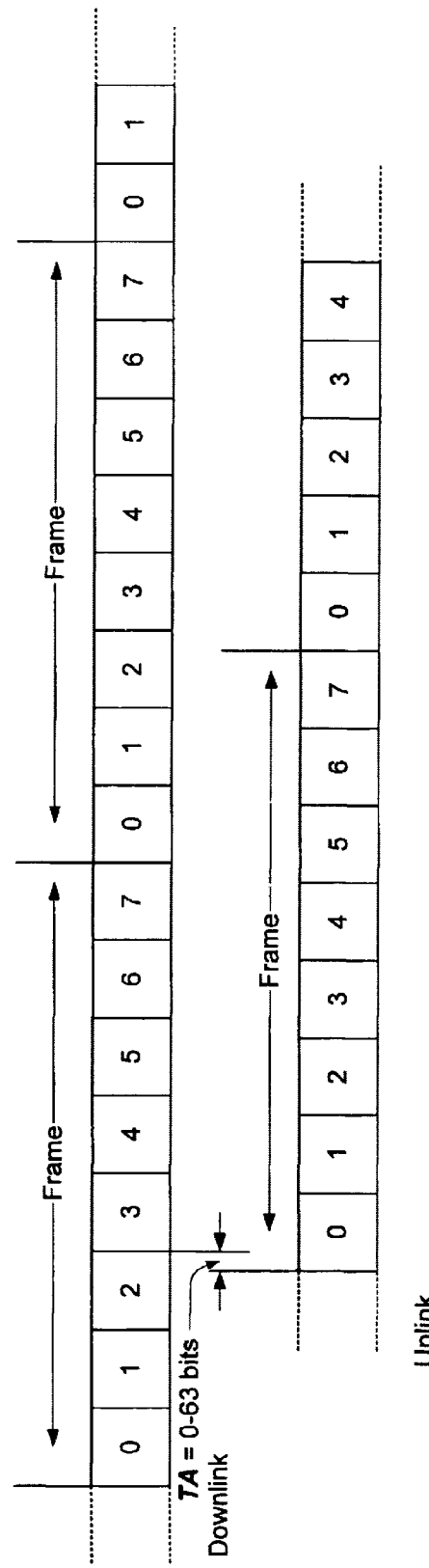
Figure 3:
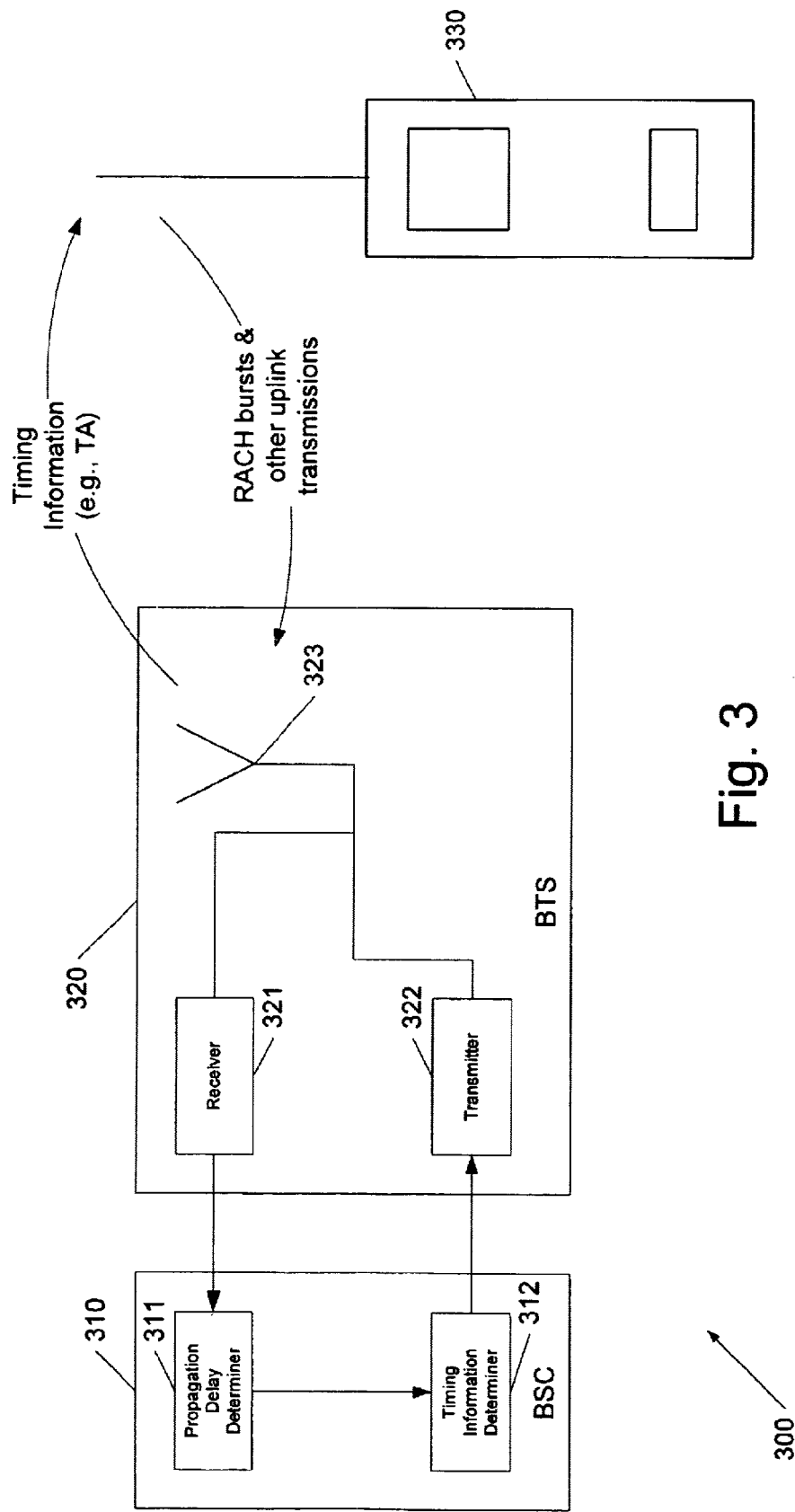
FIG. 3 is a schematic diagram illustrating a wireless communications apparatus according to an embodiment of the present invention.

FIG. 3 illustrates a base station, in particular, a base station subsystem (BSS) 300 including a base transceiver station (BTS) 320 and base station controller (BSC) 310 as commonly implemented in GSM-compliant systems, for communicating with a terminal 330 according to embodiments of the present invention described herein. The BTS 320 includes a receiver 321 and a transmitter 322, each of which is coupled to an antenna 323. Transmissions from a terminal 330 (e.g., RACH bursts), that are received by the receiver 321 are conveyed to a propagation delay determiner 311 implemented in the BSC 310, which determines a propagation delay between the BTS 320 and the terminal 330. Based on the determined propagation delay, a timing information determiner 312 determines timing information, e.g., a timing advance value TA, that is transmitted to the terminal 330 by the transmitter 322.

The discussion of FIGS. 4A–15 that follows will describe exemplary apparatus and operations for providing expanded range, and will be described in continuing reference to the base station 300 and terminal 330 apparatus illustrated in FIG. 3. It will be understood that the BTS 320 and BSC 310 represent cellular network elements that are typically utilized in a wireless system conforming to the GSM recommendations. The BSC 310 may include a processor, e.g., a computer, microprocessor, microcontroller, or other data processing apparatus, in which the propagation delay determiner 311 and the timing information determiner 312 may be implemented, and which processes information received by the receiver 321 and produces information that is transmitted by the transmitter 322. It will be appreciated that, although they are not shown, a number of other BTS or BSC components may also be present, such as mixers, duplexers, frequency synthesizers, power supplies and the like. Operations of such components are well known, and need not be discussed in detail herein. It will also be appreciated that the methods and apparatus of the present invention may be implemented using network architectures other than those utilized in GSM systems, such as network architectures of other time-division multiplexed systems (e.g., those conforming to IS-136 standards).

FIGS. 6–7, 9, 12–13 and 16 are flowchart illustrations of exemplary operations for communicating in a wireless communications system according to various aspects of the present invention. It will be understood that blocks of these flowcharts, and combinations of blocks in these flowcharts, can be implemented by computer program instructions which may be loaded and executed on a computer or other programmable data processing apparatus, such as a computer other data processing apparatus in the BSS 300 of FIG. 3, or in other components of a wireless communications system, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowcharts of FIGS. 6–7, 9, 12–13 and 16 support combinations of means for performing the specified functions and combinations of steps for performing the specified functions. It will also be understood that each block of the flowcharts of FIGS. 6–7, 9, 12–13 and 16, and combinations of blocks therein, can be implemented by special purpose hardware-based computer systems which perform the specified functions or steps, or combinations of special purpose hardware and computer instructions.

Figure 5:
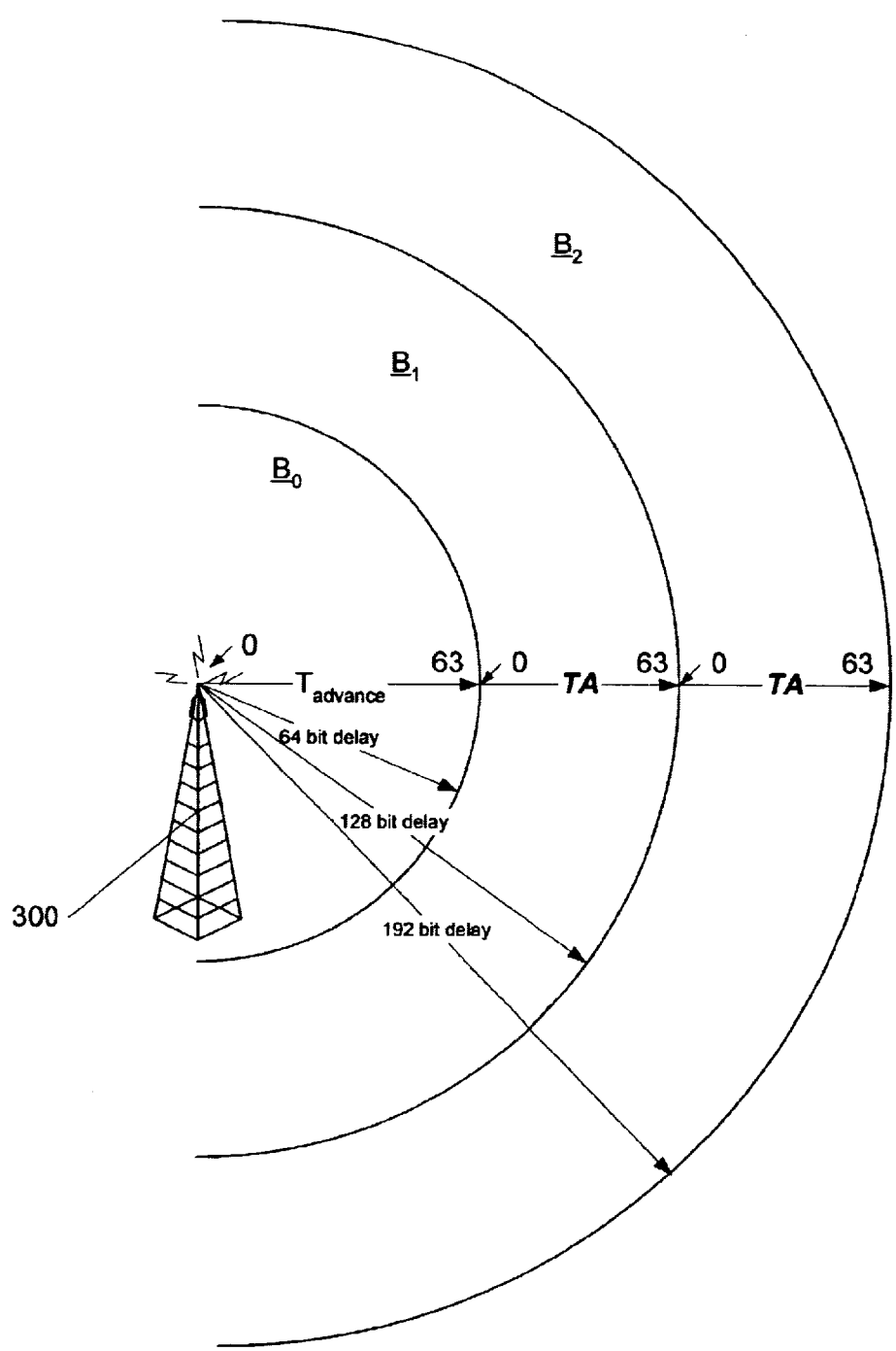
FIG. 5 is a schematic diagram illustrating ranges and associated timing advance values for a wireless communications system according to an embodiment of the present invention.

According to a first aspect of the present invention illustrated in FIGS. 4A–4B and 5, transmissions from respective groups of terminals at respective ranges with respect to a BSS 300 are transmitted on respective different uplink carrier frequencies using respective time-offset frame structures. FIG. 4A illustrates a representative downlink frame structure 410a and first and second uplink frame structures 420a, 430a on respective first and second frequencies at a BSS 300. The downlink frame structure 410a and the uplink frame structures 420a, 430a include respective series of frames F, each of which includes a series of time slots 0–7.

Referring now to FIG. 4A in conjunction with FIG. 5, the first and second uplink frame structures 420a, 430a are used on respective first and second carrier frequencies to receive transmissions from terminals at respective ranges, e.g., from ranges $B_0$ and $B_1$ illustrated in FIG. 5. The first and second uplink frame structures 420a, 430a are time-offset by a time interval $T_{offset}$, here illustrated as the maximum amount of timing advance for a 6-bit timing advance value (64 bits) as used in a GSM system.

FIG. 4B illustrates a representative downlink frame structure 410b and a representative uplink frame structure 420b at a terminal 330, corresponding to the downlink and uplink frame structures 410a, 420a of FIG. 4A. The terminal 330 in the range $B_0$ applies a timing advance TA, here shown as having a value of 0 to 63 bits, to the uplink frame structure 420b, such the transmissions from the terminal 330 that occur at the terminal 330 according to the uplink frame structure 420b arrive at the BSS 300 synchronized to the uplink frame structure 420a.

In GSM, timing advance TA corresponds to the round-trip propagation delay PD between the terminal 330 and the BSS 300 (in bit periods), which may be calculated as function of the distance between the BSS 300 and the terminal 330 and the symbol period:

$$TA = PD = 2d/C*Ts, \qquad (1)$$

where d is the distance between the BSS 300 and the terminal 330 (km), Ts is the symbol period (sec), and C is the speed of light (km/sec). In GSM, the TA value is limited to be within a range of 0 to 63, and thus gives a maximum distance of 34.9 km between the BSS 300 and the terminal 330.

However, using the staggered frame structure of FIGS. 4A–4B and 5, range may be extended by calculating TA as the modulus 64 of the round-trip propagation delay PD between the BSS 300 and the terminal 330 (the residue or remainder after dividing PD by 64):

$$TA = mod_{64}(PD) \qquad (2)$$

Use of the modulus operation defines the ranges $B_0$–$B_2$ with respect to the BSS 300 illustrated in FIG. 5 (it will be appreciated by those skilled in the art that the number of ranges defined using such an approach can be extended beyond the number of ranges illustrated in FIG. 5). A BSS 300 communicating with a terminal 330 in a given one of the ranges transmits a timing advance value TA calculated as in (2), and instructs the terminal 330 to transmit on the carrier frequency associated with the range. The timing advance used in each range of the illustrated embodiment is within a range of 0 to 63.

Because the timing advance values are limited to values within a range of 0 and 63 bits in each range, uplink bursts from terminals in different ranges are staggered upon arrival at the BSS 300. For the GSM embodiment illustrated in FIG. 5, uplink bursts from terminals in range $B_0$ arrive 468.75 bits (3 slots) behind the start of the downlink frame. The uplink bursts from terminals in range $B_1$ are delayed an additional 64 bits, and the uplink bursts from range $B_2$ are delayed an additional 64 bits with respect to the uplink bursts from range $B_1$.

Figure 6:
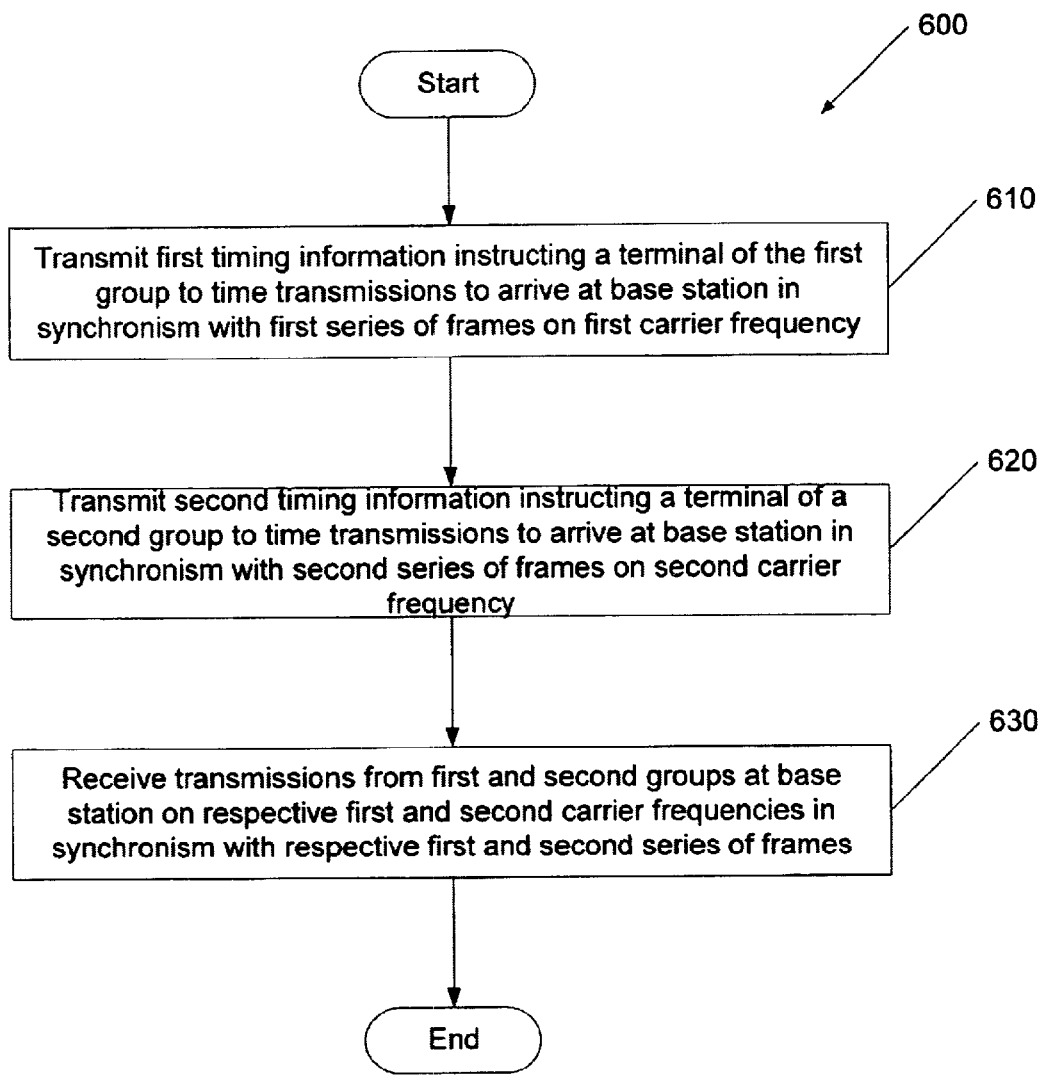
FIGS. 6–7 are flowcharts illustrating exemplary operations for communicating in a wireless communications system according to an aspect of the present invention.

Exemplary system operations 600 according to this aspect of the present invention are illustrated in FIG. 6. The BSS 300 transmits first timing information, e.g., a first timing advance value, to a terminal 330 of a first group, e.g., a terminal 330 in the range $B_0$ illustrated in FIG. 5 (Block 610). The first timing information instructs the receiving terminal 330 to time its transmissions to arrive at the BSS 300 in synchronism with a first series of frames, e.g., the uplink frame structure 420a. The BSS 300 transmits second timing information, e.g., a second timing advance value, to a terminal 330 in a second group, e.g., a terminal 330 in the range $B_1$ of FIG. 5. (Block 620). The second timing information instructs this terminal 330 to time its transmissions to arrive at the BSS 300 in synchronism with a second series of frames that is time-offset with respect to the first series of frames, e.g., with the second uplink frame structure 430a. The BSS 300 receives transmissions from the terminals on respective first and second carrier frequencies associated with the different series of frames, e.g., on the respective uplink carrier frequencies associated with the first and second uplink frame structures 420a, 430a (Block 630).

It will be appreciated that because the offset transmissions are received on separate carriers, interference between the transmissions is avoided. Additional ranges can be served by adding additional staggered uplink frame structures, thus allowing cell size to be significantly increased without collision between transmissions. Modification of terminals is not required, because the staggering is achieved by designation of uplink carrier frequencies and selection of timing advance values by the BSS 300, operations that are transparent to the terminals.

Figure 7:
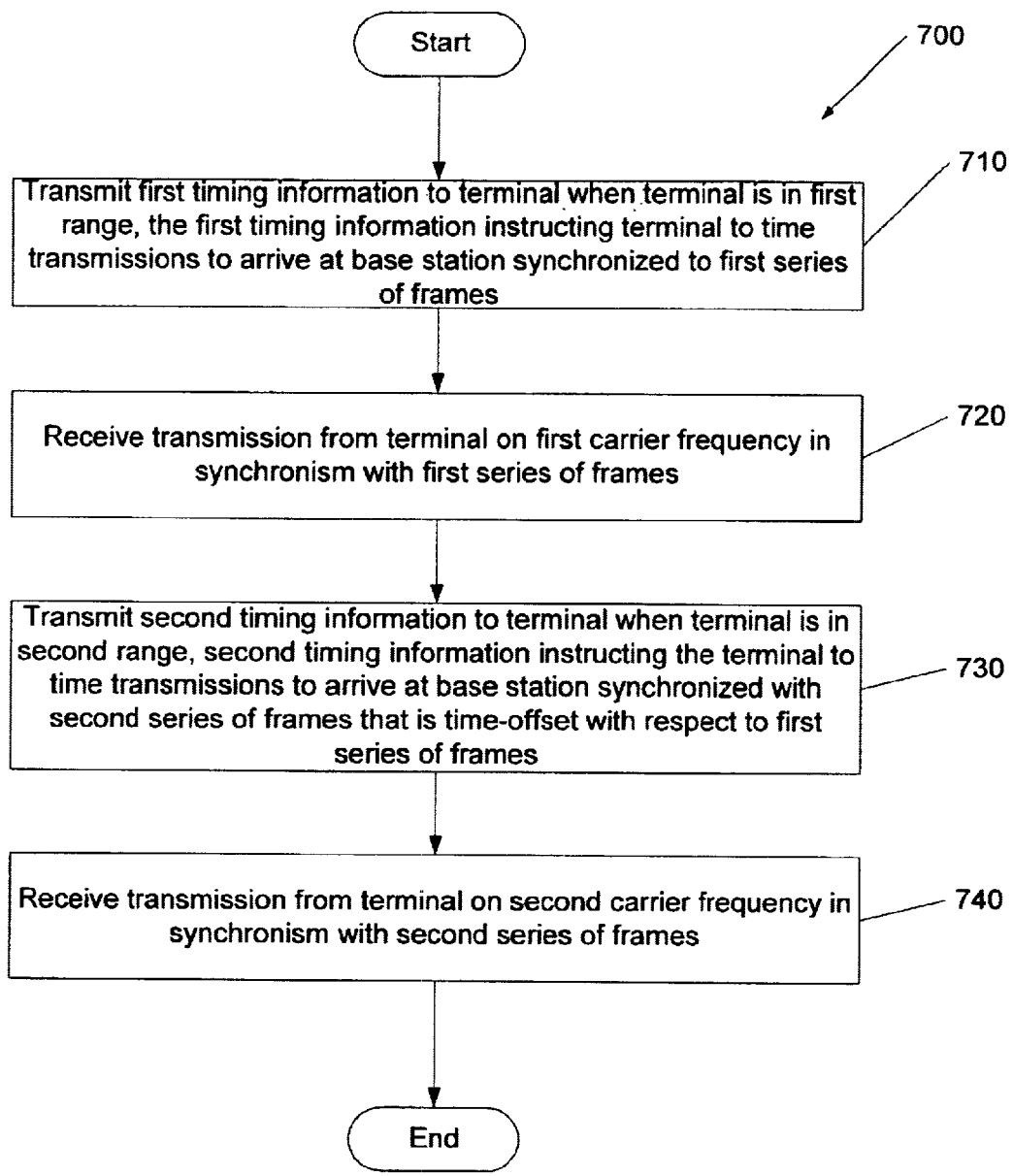

FIG. 7 illustrates exemplary operations 700 according to another aspect of the present invention, namely, operations for handing over a terminal 330 as it moves between ranges in an multi-range cell structure such as that illustrated in FIG. 5. First timing information that instructs a terminal 330 to time its transmissions on a first carrier frequency to arrive at a BSS 300 in synchronism with a first series of frames is transmitted to a terminal 330 when it is in a first range (Block 710). The BSS 300 then receives transmissions from the terminal 330 on the first carrier frequency in synchronism with the first series of frames (Block 720). When the terminal 330 moves to a second range, however, the BSS 300 transmits timing information to the terminal 330 that instructs the terminal 330 to time its transmissions on a second carrier frequency to arrive at the BSS 300 in synchronism with a second series of frames that is time-offset with respect to the first series of frames (Block 730). The BSS 300 then receives transmissions from the terminal 330 on the second carrier frequency in synchronism with the second series of frames (Block 740).

Figure 9:
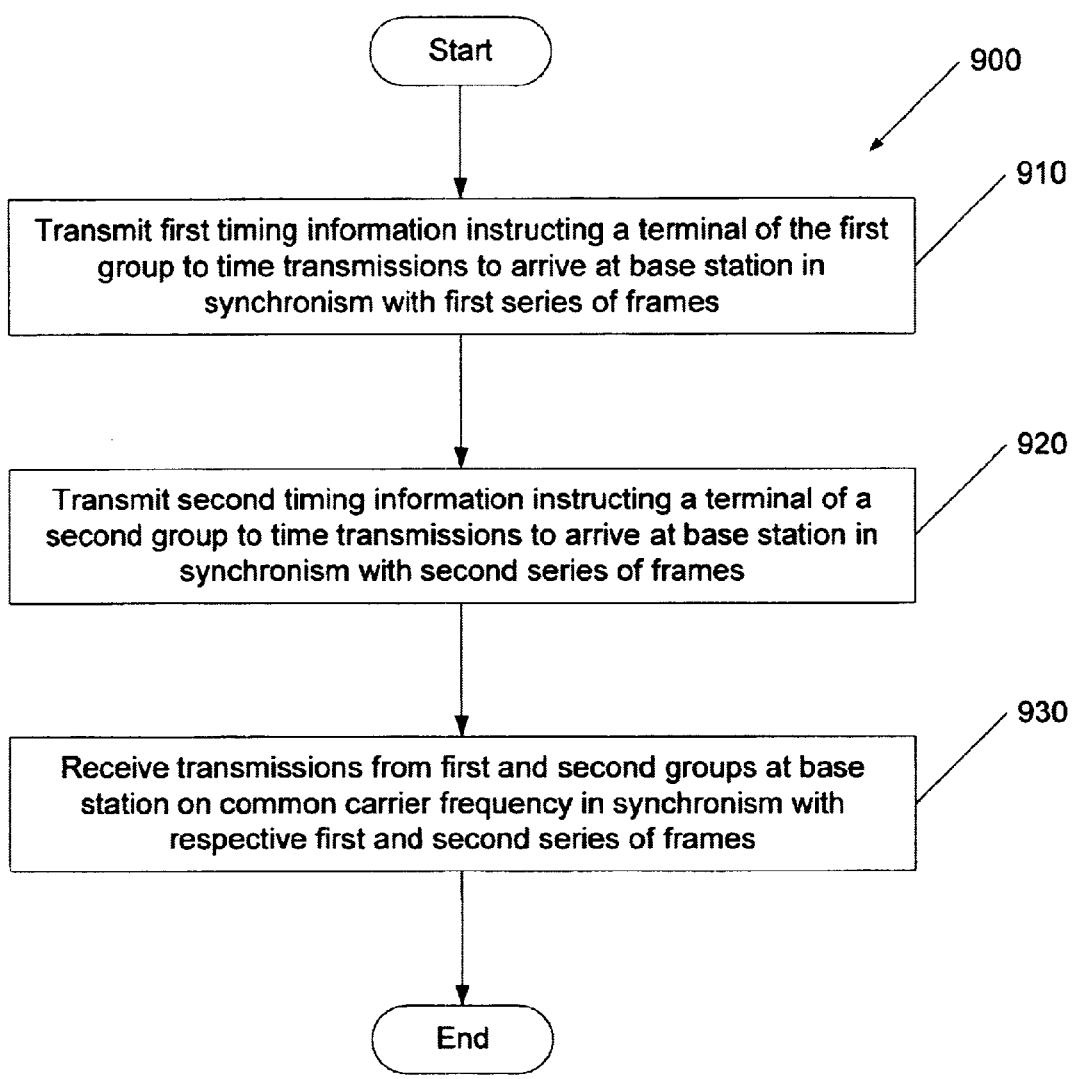
FIG. 9 is a flowchart illustrating exemplary operations for communicating in a wireless communications system according to an aspect of the present invention.

FIGS. 8A–8B and 9 illustrate yet another embodiment of the present invention, one that is particularly advantageous for use in base stations that do not have multiple carrier frequencies to provide frequency separation of staggered terminal transmissions as described above. According to this embodiment, transmissions from respective groups of terminals at respective ranges with respect to a BSS 300 are transmitted on a common carrier frequency in synchronism with respective-offset frame structures that are multiplexed on the common carrier frequency. FIG. 8A illustrates a representative downlink frame structure 810a and first and second uplink frame structures 820a, 830a at a BSS 300. The downlink frame structure 810a includes a series of frames F, each of which includes a series of time slots 0–7, while the uplink frame structures 820a, 830a include respective series of frames F', F", which include respective series of time slots 0–2, 3–6. The time-multiplexing of the frame structures 820a, 830a results in the loss of a portion of the available capacity on the common carrier frequency, as the second uplink frame structure 830a is delayed with respect to the first uplink frame structure 820a by a portion of a time slot.

Referring now to FIG. 8A in conjunction with FIG. 5, first and second uplink frame structures 820a, 830a are used on a common carrier frequency to receive transmissions from terminals at respective ranges, e.g., from ranges $B_0$ and $B_1$ illustrated in FIG. 5. The first and second uplink frame structures 820a, 830a are time-offset by a time interval $T_{offset}$, here illustrated as the maximum amount of timing advance (64 bits) for a 6-bit timing advance value as used in a GSM system.

FIG. 8B illustrates a representative downlink frame structure 810b and a representative uplink frame structure 820b at a terminal 330, corresponding to the downlink and uplink frame structures 810a, 820a of FIG. 4A. The terminal 330 in range $B_0$ applies a timing advance TA, here shown as having a value of 0 to 63 bits, to the uplink frame structure 820b, such the transmissions from the terminal 330 that occur at the terminal 330 according to the uplink frame structure 820b arrive at the BSS 300 synchronized to the uplink frame structure 820a. Due to the time-multiplexing of the frame structures on the uplink, the system constrains the terminal 330 to transmission on the carrier frequency in slots 0–2. This constraint is transparent to the terminal, which operates as it normally would in a GSM or other conventional system. The slots 3–6 are shown in dotted line in FIG. 8B to illustrate the relative position of these slots to the slots 0–2 used by the terminal in range $B_0$; the slots 3–6 may be assigned to a terminal in range $B_1$ such that that terminal's transmissions are timed to arrive at the BSS 300 in synchronism with the second uplink frame structure 830a.

Exemplary system operations 900 according to this aspect of the present invention are illustrated in FIG. 9. The BSS 300 transmits first timing information (e.g., a first timing advance value), to a terminal 330 of a first group (e.g., a terminal 330 in the range $B_0$ illustrated in FIG. 5) (Block 910). The first timing information 30 instructs the receiving terminal 330 to time its transmissions to arrive at the BSS 300 in synchronism with a first series of frames, e.g., the uplink frame structure 820a of FIG. 8A. The BSS 300 transmits second timing information (e.g., a second timing advance value), to a terminal 330 in a second group (e.g., a terminal 330 in the range $B_1$ of FIG. 5) (Block 920). The second timing information instructs this terminal 330 to time its transmissions to arrive at the BSS 300 in synchronism with a second series of frames that is time-offset with respect to the first series of frames, e.g., with the second uplink frame structure 830a of FIG. 8A. The BSS 300 receives transmissions from the terminals on a common carrier frequency, in synchronism with respective ones of the first and second uplink frame structures 820a, 830a (Block 930).

FIGS. 10A–10B and 11–12 illustrate yet another embodiment of the present invention, in which overlapping ranges are used to provide hysteresis for a terminal 330 moving between ranges. The embodiments illustrated in FIGS. 4A–4B, 5–7, and 8A–8B may work well for fixed terminals and for mobile terminals that stay within a same range for the duration of a call. However, if a terminal moves from one range to another during a call, the call may need to be handed over to the carrier frequency allocated for that range. For proper handoff, the mobile terminal typically would have to maintain its connection for the old range in order to exchange handoff messages before switching over to the new carrier frequency. Because the frame structures are synchronized, the handoff message can include a new timing advance value to be used on the new channel, and the terminal can begin communication on the new channel with the new timing advance value.

Handoff is preferably done slightly outside of the range (within about ½ km for the illustrated embodiments) so that the uplink burst time at the base station is not off by more than 1 bit period. In addition, because the system may try to switch a terminal when it is between ranges, it is also preferable that ranges have some overlapping coverage area to prevent dropping of a call. Accordingly, the aspect of the present invention illustrated in FIGS. 10A–10B and 11–12 involves dividing a cell into overlapped ranges and, preferably, providing hysteresis into the handoff process to avoid frequent handoff between channels at the range edge.

As illustrated in FIGS. 10A and 10B, frame and slot timing similar to that illustrated in FIGS. 4A–4B may be used, except with reduced offset between the respective uplink frame structures. FIG. 10A illustrates a representative downlink frame structure 1010a and first and second uplink frame structures 1020a, 1030a at a BSS 300. The downlink frame structure 1010a and the uplink frame structures 1020a, 1030a include respective series of frames F, each of which includes a series of time slots 0–7. First and second uplink frame structures 1020a, 1030a are used on respective carrier frequencies to receive transmissions from terminals at respective ranges, e.g., from ranges $B_0$ and $B_1$ illustrated in FIG. 11. The first and second uplink frame structures 1020a, 1030a are time-offset by a time interval $T_{offset}$, which is an amount (52 bits) that is less than the maximum amount (64 bits) of timing advance for a 6-bit timing advance value as used in a GSM system.

FIG. 10B illustrates a representative downlink frame structure 1010b and a representative uplink frame structure 1020b at a terminal 330 in a range $B_0$ corresponding to the downlink and uplink frame structures 1010a, 1020a of FIG. 10A. The terminal 330 in the range $B_0$ applies a timing advance TA, having a value between 0 and 63 bits to the uplink frame structure 1020b, such that the transmissions from the terminal 330 that occur at the terminal 330 according to the uplink frame structure 1020b arrive at the BSS 300 synchronized to the uplink frame structure 1020a. However, the updated timing advance value chosen for a particular terminal in an overlapping region depends on which carrier frequency the terminal is currently using.

Figure 11:
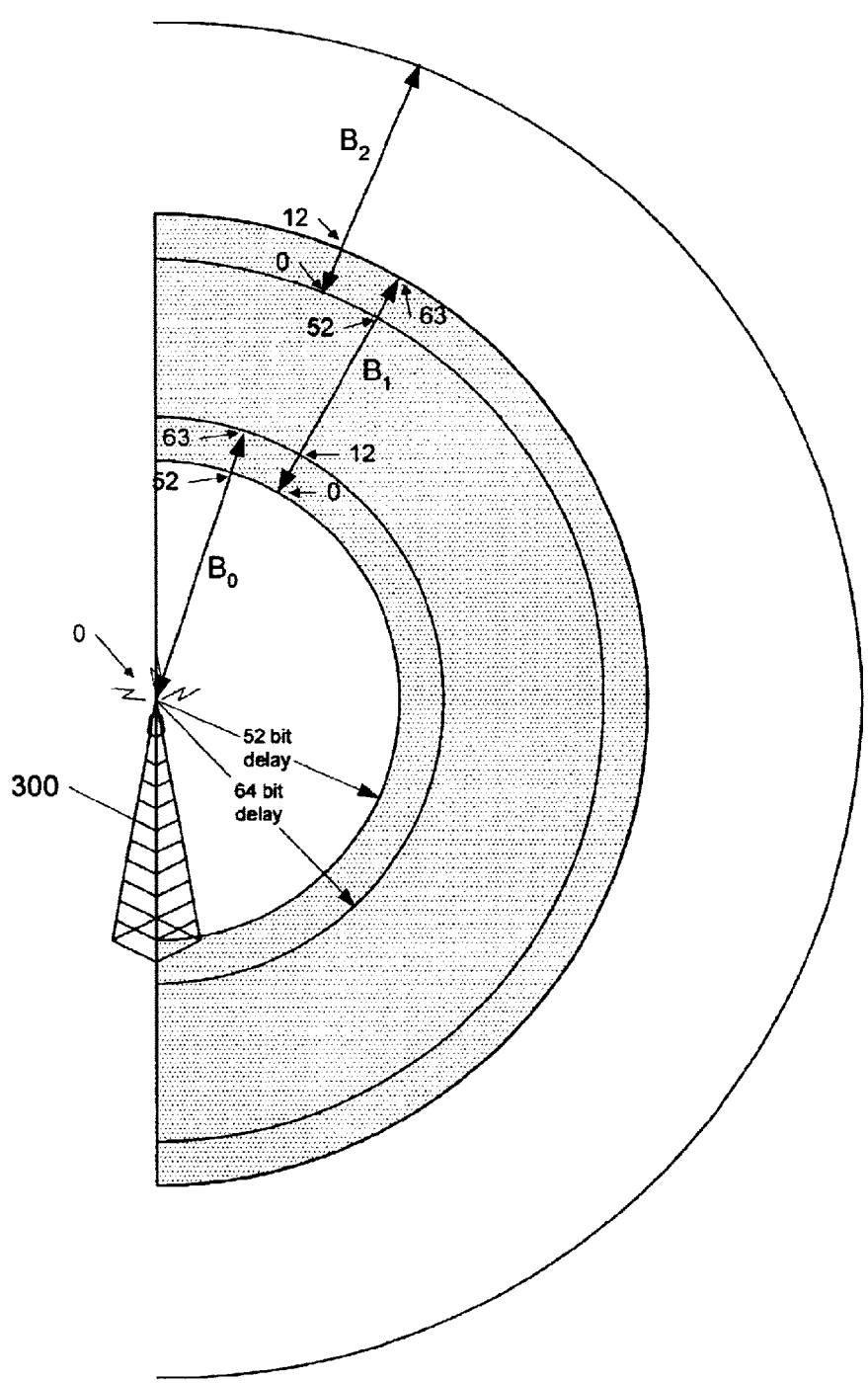
FIG. 11 is a schematic diagram illustrating ranges and associated timing advance values for a wireless communications system according to an embodiment of the present invention.

FIG. 11 provides an example of overlapping of ranges $B_0$, $B_1$, $B_2$ that overlap for 12 bits of timing advance value, providing an overlap distance of about 6.6 km. If ($\Delta d + \delta$) is the distance of each range within a large cell, and $\delta$ is the overlapping distance, the range of a range $B_1$ is given by:

$$B_i = \{i*\Delta d, (i+1)\Delta d + \delta\},$$

where $\Delta d = 52$ Ts. C/2 and $\delta = 12$ Ts. C/2. For example, range $B_0$ ranges between 0 and ($\Delta d + \delta$) km, and the range $B_1$ ranges between $\Delta d$ and ($2\Delta d + \delta$) km. As with the previously described embodiments, the timing advance is within the range of 0 to 63. However, in the area of overlap of two ranges, two different timing advance values may be sent to a terminal, depending on the current state of the terminal.

Figure 12:
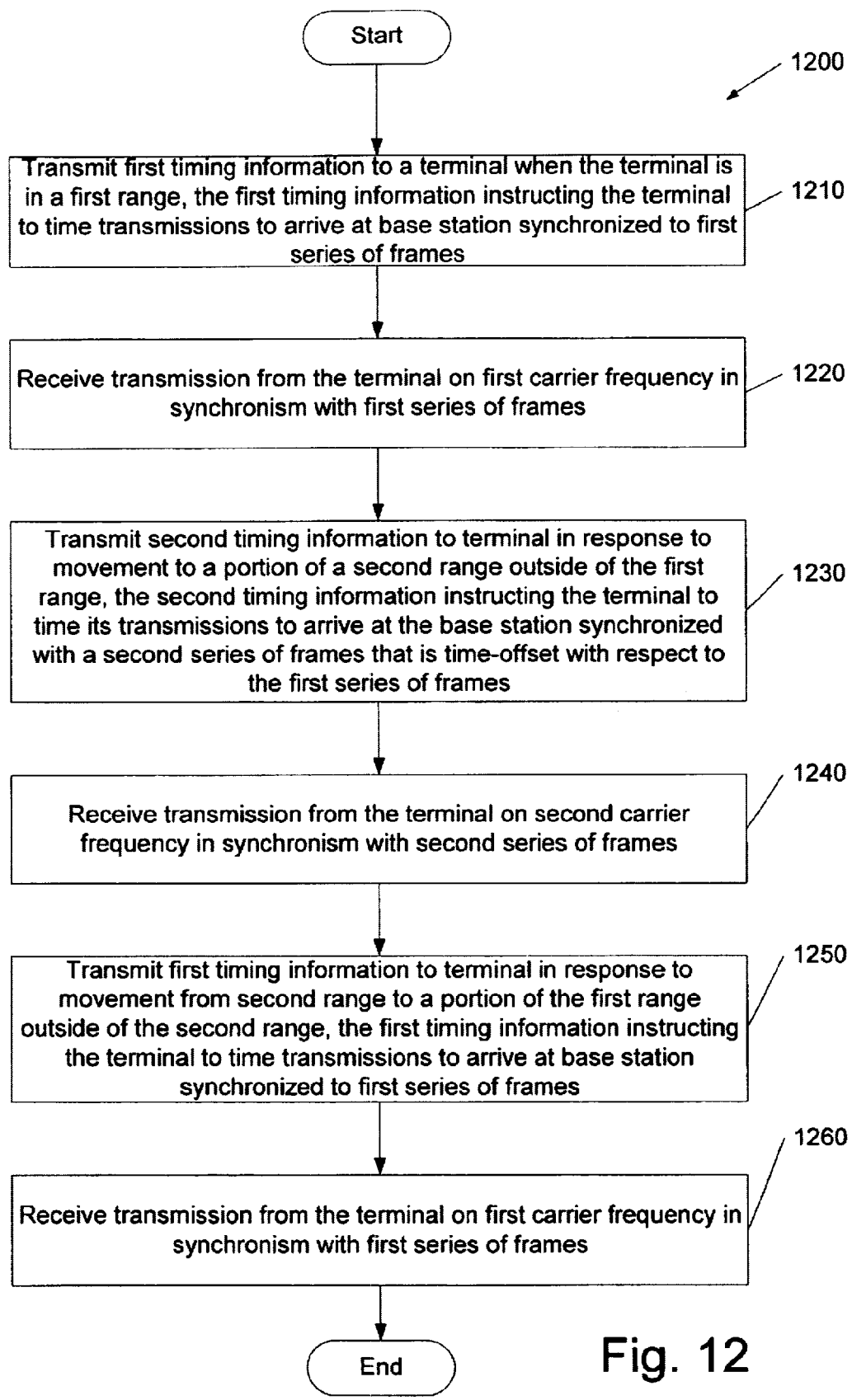
FIGS. 12–13 are flowcharts illustrating exemplary operations for communicating in a wireless communications system according to an aspect of the present invention.

FIG. 12 illustrates exemplary operations 1200 for providing hysteresis as a terminal 330 moves between overlapping ranges. A BSS 300 transmits first timing information to a terminal 330 when the terminal 330 is in a first range, the first timing information instructing the terminal 330 to time its transmissions to arrive at the BSS 300 in synchronism with a first series of frames (Block 1210). The BSS 300 receives a transmission from the terminal 330 on a first carrier frequency in synchronism with the first series of frames (Block 1220). In response to movement of the terminal 330 to a portion of a second, overlapping range, in particular, a portion of the second range that lies outside of the first range, the BSS 300 transmits second timing information to instruct the terminal 330 to synchronize its transmissions to a second series of frames that is time-offset with respect to the first series of frames (Block 1230). The BSS 300 then receives a transmission from the terminal 330 on a second carrier frequency in synchronism with the second series of frames (Block 1240). In response to the terminal 330 moving from the second range to a portion of the first range that lies outside of the second range, the BSS 300 again transmits timing information instructing the terminal 330 to again synchronize its transmissions to the first series of frames (Block 1250). The BSS 300 then receives a transmission from the terminal 330 in synchronism with the first series of frames (Block 1260).

For this illustrated embodiment of FIGS. 10A–10B and 11, timing advance values TA, i.e., the values sent to the terminal, may be computed as follows:

$$TA = mod_{64} (PD + n*12) \text{ for range n.}$$

Figure 13:
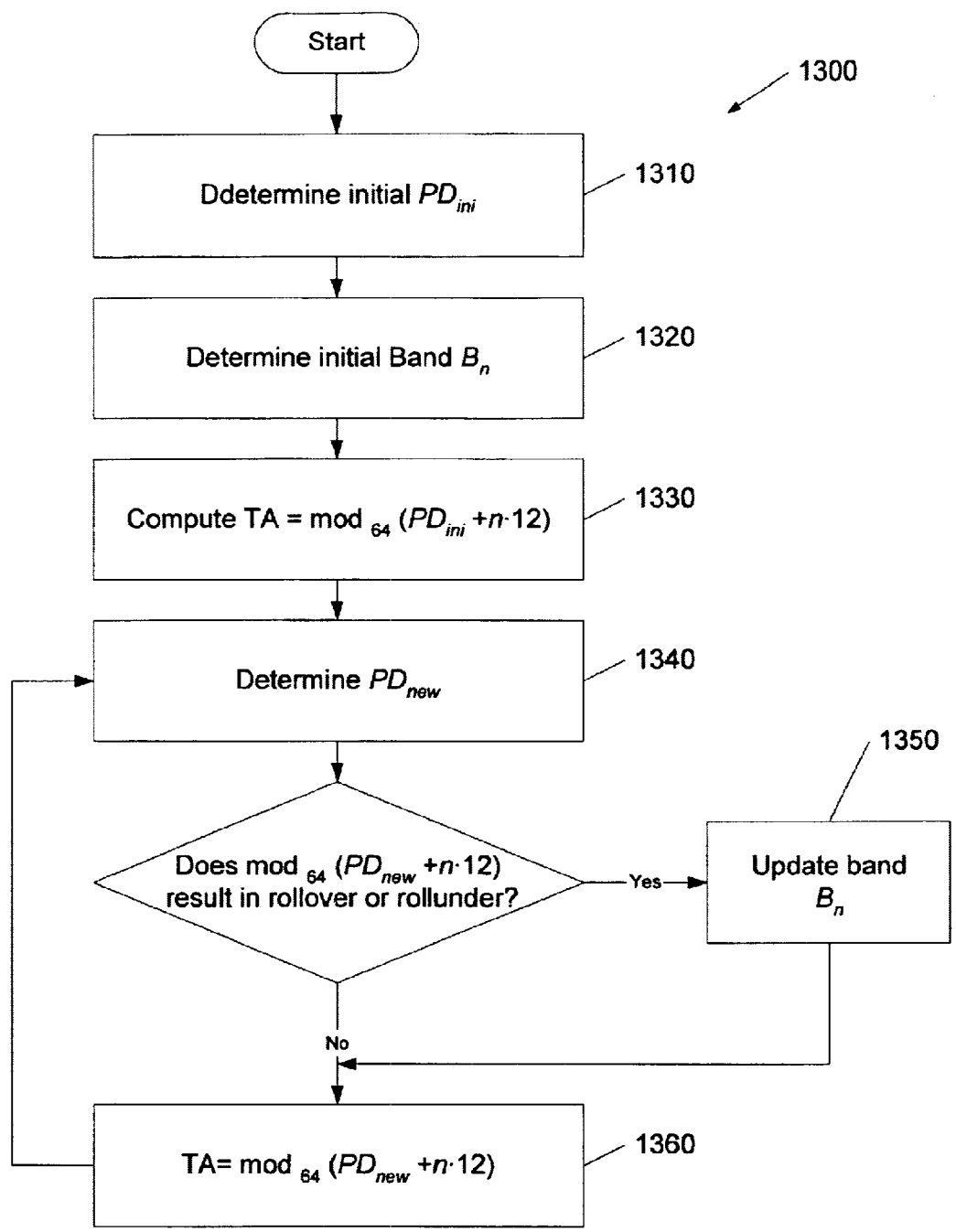

Exemplary operations 1300 for computing TA are shown in FIG. 13. An initial round-trip propagation delay $PD_{ini}$ is determined, e.g., from a RACH burst (Block 1310). Based on the initial propagation delay $PD_{ini}$, the BSS 300 determines in which range $B_n$ the terminal 330 is located (Block 1320). The BSS 300 then computes the timing advance TA and conveys it to the terminal 330 (Block 1330). Subsequently, the BSS 300 determines an updated round-trip propagation delay $PD_{new}$ (Block 1340). If the new propagation delay value $PD_{new}$ causes a rollover or rollunder of the timing advance value indicating movement to a new range $B_n$, the BSS 300 updates range $B_n$ (Block 1350), and computes a new timing advance value TA using the updated n (Block 1360). If not, the BSS 300 leaves n unchanged in computing the new timing advance value TA (Block 1360). The BSS 300 repeats operations for determining the timing advance (Blocks 1350 and/or 1360), for each new propagation delay value $PD_{new}$ (Block 1340).

Figure 14:
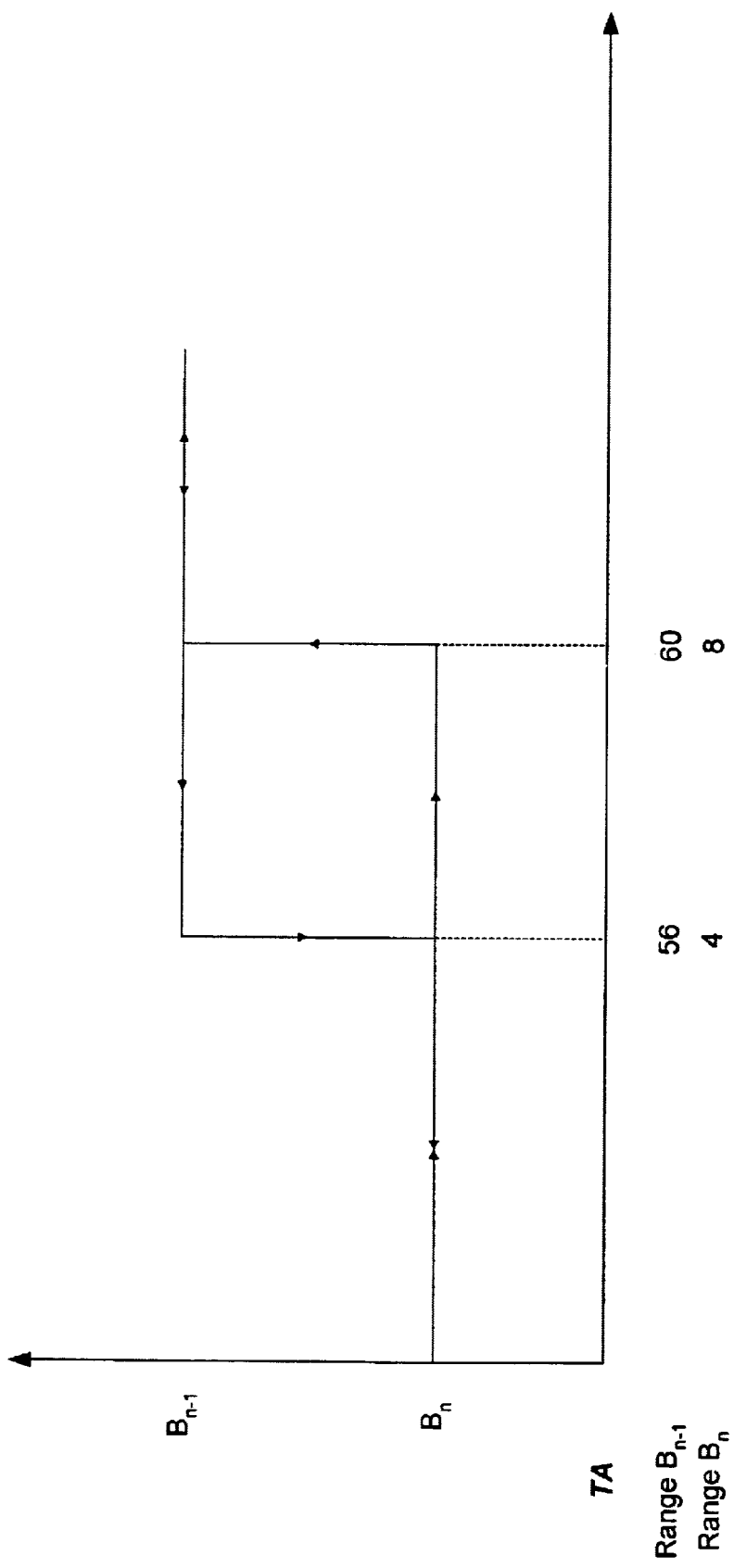
FIG. 14 is a diagram illustrating an exemplary hysteresis loop for switching between ranges according to an embodiment of the present invention.

This manner of computing timing advance helps reduce the frequency of switching between carriers (or between frames in a single carrier) during a call, providing hysteresis as the terminal 330 moves between ranges. For the exemplary embodiment of FIGS. 10A–10B and 11–13, 4 bits of overlap (approximately 2.2 km), are provided. It will be appreciated that numerous variations of the operations illustrated fall within the scope of the present invention. For example, in one variation, instead of defining the ranges such that the first and second boundaries of a range coincided with a minimum timing advance value TA=0 and a maximum timing advance value TA=63, range boundaries may be established such that switching between staggered frame structures occurs at values intermediate to the maximum and minimum TA values. An example of such boundary definition is shown in FIG. 14, which illustrates switching points between ranges $B_{n-1}$ and $B_n$ at timing advance values of TA=4 and TA=60. It will be understood that, in general, parameters such as the amount of overlap of ranges and timing advance values at which switching occurs can be determined based on performance requirements and system capabilities.

Figure 15:
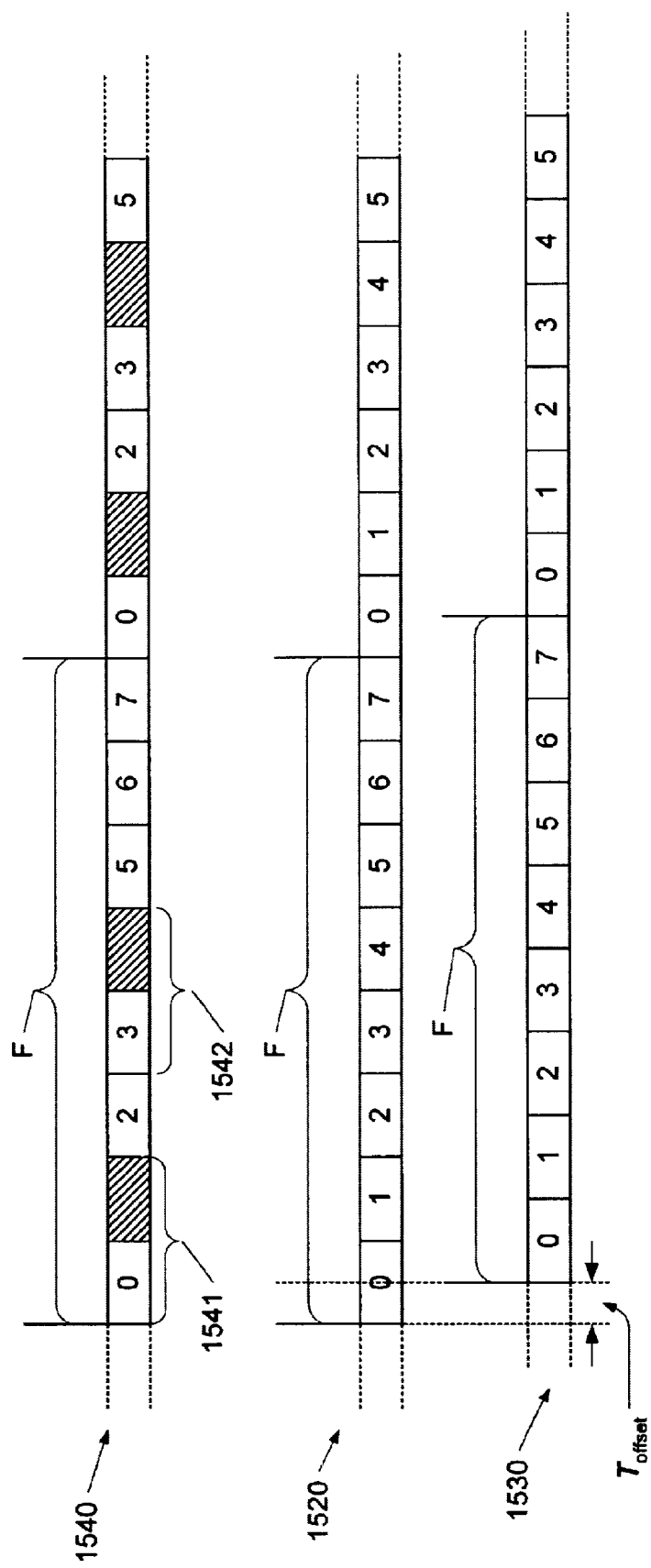
FIG. 15 is a timing diagram illustrating random access channel and uplink frame structures used in a wireless communications system according to another embodiment of the present invention.
Figure 16:
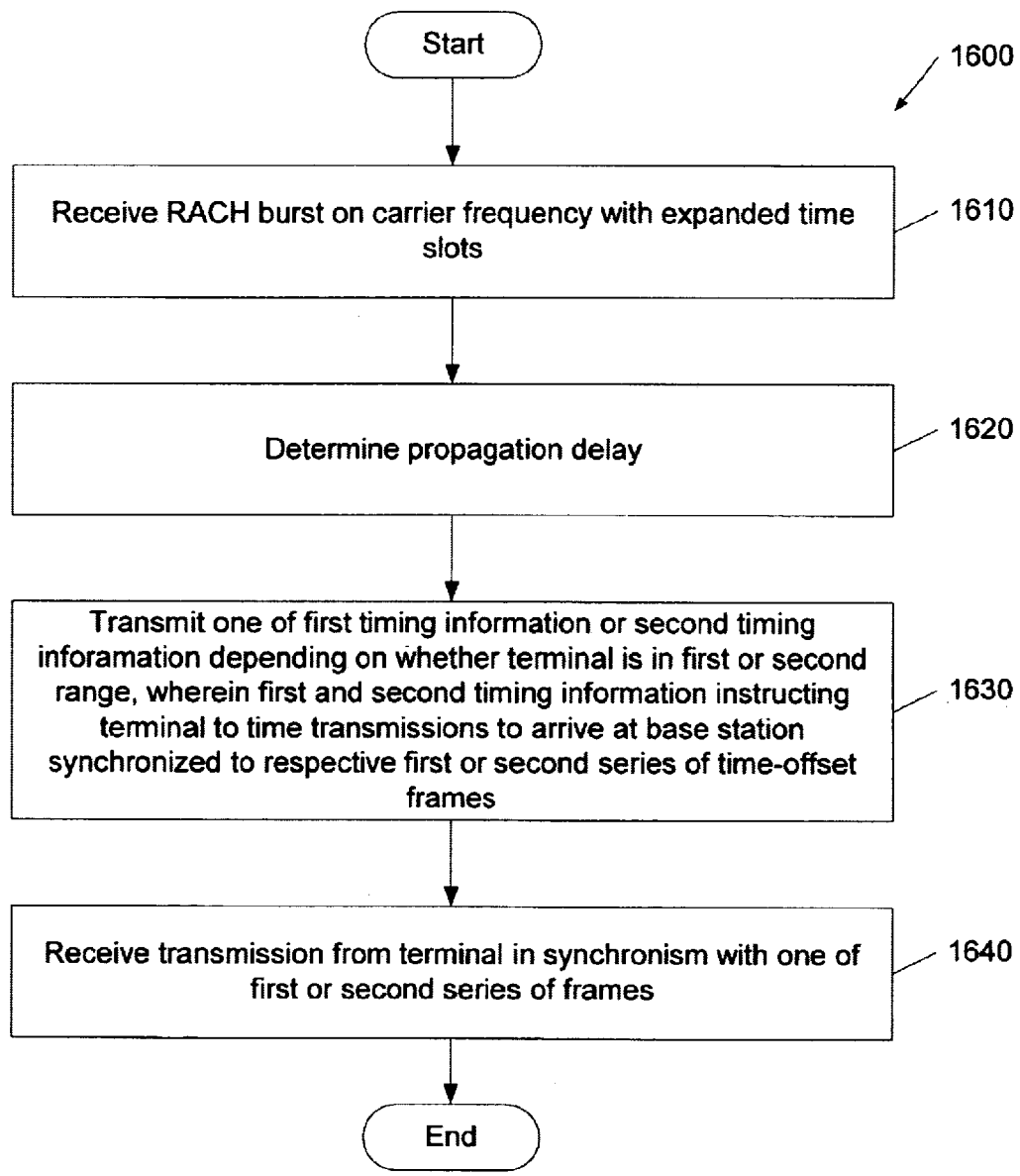
FIG. 16 is a flowchart illustrating exemplary operations for communicating with a terminal according to another aspect of the present invention.

FIGS. 15–16 illustrate yet another aspect of the present invention, in particular, an exemplary technique for providing access for terminals using an expanded slot RACH frame 1540, and for assigning terminals to slots on staggered traffic channel frames 1520, 1530. Terminals in an expanded-range cell transmit RACH burst that are timed to fall within "expanded" RACH slots of a first carrier frequency, where the expanded slots 1541, 1542 beginning with slots 0 and 3 are provided by not assigning traffic to "normal" slots 1 and 4. The RACH slots 1541, 1542 are expanded to tolerate increased propagation delay from terminals at outer reaches of the expanded cell. Upon receipt of a RACH burst, the BSS 300 may assign a terminal to a slot on one of first and second carriers with staggered frame structures 1520, 1530, as described with reference to FIGS. 4A–4B above, or to slots of time-multiplexed staggered frames as describe with reference to FIGS. 8A–8B.

Exemplary operations 1600 according to this aspect of the present invention are illustrated in FIG. 16. A BSS 300 receives a RACH burst in an expanded RACH slot (Block 1610). Based on the timing of the RACH burst, the BSS 300 determines the propagation delay for the terminal 330 (Block 1620). Based on whether the propagation delay indicates that the terminal 330 is in a first range or a second range, the BSS 300 transmits first or second timing information that instructs the terminal 330 to time its transmissions to arrive in synchronism with one of first or second time-offset series of frames, which may be on separate carriers or multiplexed on the same carrier (Block 1630). The BSS 300 then receives a transmission from the terminal 330 in synchronism with the appropriate series of frames (Block 1640).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of operating a time-division multiplexed wireless communications system, the method comprising the steps of:
    instructing a first group of terminals to time their transmissions to arrive at a base station in synchronism with a first series of frames;
    instructing a second group of terminals to time their transmissions to arrive at the base station in synchronism with a second series of frames that is time-offset with respect to the first series of frames; and
    receiving transmissions from a terminal of the first group and from a terminal of the second group on a common carrier frequency in synchronism with respective ones of the first and second series of frames, wherein the first and second series of frames are multiplexed on the common carrier frequency.

2. A method according to claim 1:
    wherein the first group of terminals is located at a first range with respect to the base station; and
    wherein the second group of terminals is located at a second range with respect to the base station.

3. A method according to claim 2, wherein the second range is more distant from the base station than the first range, and wherein the second series of frames is delayed with respect to the first series of frames.

4. A method according to claim 2, wherein the first and second ranges overlap.

5. A method according to claim 1:
    wherein said step of instructing a first group of terminals comprises the step of transmitting first timing information from the base station that instructs a terminal of the first group to time its transmissions to arrive at the base station in synchronism with the first series of frames; and
    wherein said step of instructing a second group of terminals comprises the step of transmitting second timing information from the base station that instructs a terminal of the second group to time its transmissions to arrive at the base station in synchronism with the second series of frames.

6. A method according to claim 5:
    wherein said step of transmitting first timing information comprises the step of transmitting a first timing advance value; and
    wherein said step-of transmitting second timing information comprises the step of transmitting a second timing advance value.

7. A method according to claim 1, wherein cach frame of the first and second series of frames comprises at least one time slot, and wherein a beginning of a frame from the second series of frames is delayed with respect to an end of a preceding frame of the first series of frames by a time interval that is less than the duration of one time slot.

8. A method according to claim 1, wherein said step of instructing a first group of terminals and said step of instructing a second group of terminals is preceded by the steps of:

determining respective propagation delays between respective terminals and the base station; and categorizing the terminals into the first and second groups based on the determined propagation delays.

9. A method according to claim 8, wherein said step of determining respective propagation delays comprises the steps of:

receiving random access bursts from terminals at the base station; and determining respective propagation delays for respective terminals based on timing of the received random access bursts.

10. A method of operating a base station in a time-division multiplexed wireless communications system, the method comprising the steps of:

transmitting first timing information to a terminal when the terminal is in a first range, the first timing information instructing the terminal to time its transmissions to arrive at the base station synchronized to a first series of frames;

transmitting second timing information to the terminal when the terminal is in a second range, the second timing information instructing the terminal to time its transmissions to arrive at the base station synchronized with a second series of frames that is time-offset with respect to the first series of frames, wherein the first and second ranges overlap; and providing hysteresis in instructing the terminal to synchronize its transmissions to one of the first series of frames or the second series of frames when the terminal moves between the first and second ranges.

11. A method according to claim 10:

wherein said step transmitting first timing information is followed by the step of receiving a transmission from the terminal in synchronism with the first series of frames on a first carrier frequency; and wherein said step of transmitting second timing information is followed by the step of receiving a transmission from the terminal in synchronism with the second series of frames on a second carrier frequency.

12. A method according to claim 10:

wherein said step of transmitting first timing information is followed by the step of receiving a transmission from the terminal in synchronism with the first series of frames on a common carrier frequency; and wherein said step of transmitting second timing information is followed by the step of receiving a transmission from the terminal in synchronism with the second series of frames on the common carrier frequency.

13. A method according to claim 12, wherein each frame of the first and second frame series comprises at least one time slot, and wherein a beginning of a frame from the second series of frames is delayed with respect to an end of a preceding frame of the first series of frames by a time interval that is less than the duration of one time slot.

14. A method according to claim 10, wherein the second range is more distant from the base station than the first range, and wherein the second series of frames is delayed with respect to the first series of frames.

15. A method according to claim 10:

wherein said step of transmitting second timing information comprises the step of transmitting the second timing information in response to movement of the terminal from the first range to a portion of the second range outside of the first range; and wherein said step of transmitting second timing information is followed by the step of transmitting the first timing information to the terminal in response to movement of the terminal from the second range to a portion of the first range outside of the second range, such that hysteresis is provided when the terminal moves between the first and second ranges.

16. An apparatus in a time-division multiplexed wireless communications system, the apparatus comprising:

means for instructing a first group of terminals to time their transmissions to arrive at a base station in synchronism with a first series of frames;

means for instructing a second group of terminals to time their transmissions to arrive at the base station in synchronism with a second series of frames that is time-offset with respect to the first series of frames; and means for receiving transmissions from a terminal of the first group and from a terminal of the second group on a common carrier frequency in synchronism with respective ones of the first and second series of frames, wherein the first and second series of frames are multiplexed on the common carrier frequency.

17. An apparatus according to claim 16:

wherein the first group of terminals is located at a first range with respect to the base station; and wherein the second group of terminals is located at a second range with respect to the base station.

18. An apparatus according to claim 17, wherein the second range is more distant from the base station than the first range, and wherein the second series of frames is delayed with respect to the first series of frames.

19. An apparatus according to claim 17, wherein the first and second ranges overlap.

20. An apparatus according to claim 17:

wherein said means for transmitting first timing information comprises means for transmitting a first timing advance value; and wherein said means for transmitting second timing information comprises means for transmitting a second timing advance value.

21. An apparatus according to claim 16, wherein each frame of the first and second series of frames comprises at least one time slot, and wherein a beginning of a frame from the second series of frames is delayed with respect to an end of a preceding frame of the first series of frames by a time interval that is less than the duration of one time slot.

22. An apparatus according to claim 16, further comprising:

means for determining respective propagation delays between respective terminals and the base station; and means for categorizing the terminals into the first and second groups based on the determined propagation delays.

23. An apparatus according to claim 22, wherein said means for determining respective propagation delays comprises:

means for receiving random access bursts from terminals at the base station; and means, responsive to said means for receiving random access bursts, for determining respective propagation delays for respective terminals based on timing of the received random access bursts.

24. An apparatus according to claim 16:

wherein said means for instructing a first group of terminals comprises means for transmitting first timing information that instructs a terminal of the first group to time its transmissions to arrive at the base station in synchronism with the first series of frames; and wherein said means for instructing a second group of terminals comprises means for transmitting second timing information that instructs a terminal of the second group to time its transmissions to arrive at the base station in synchronism with the second series of frames.

25. A base station for a time-division multiplexed wireless communications system, the base station comprising:

means for transmitting first timing information to a terminal when the terminal is in a first range with respect to a base station , the first timing information instructing the terminal to time its transmissions to arrive at the base station synchronized to a first series of frames; and means for transmitting second timing information to the terminal when the terminal is in a second range, the second timing information instructing the terminal to time its transmissions to arrive at the base station synchronized with a second series of frames that is time-offset with respect to the first series of frames, wherein the first and second ranges overlap, and wherein said means for transmitting first timing information and said means for transmitting second timing information provide hysteresis in instructing the terminal to synchronize its transmissions to one of the first series of frames or the second series of frames when the terminal moves between the first and second ranges.

26. A base station according to claim 25, further comprising:

means for receiving a transmission from the terminal in synchronism with the first series of frames on a first carrier frequency; and means for receiving a transmission from the terminal in synchronism with the second series of frames on a second carrier frequency.

27. A base station according to claim 25, further comprising means for receiving a transmission from the terminal in synchronism with one of the first and second series of frames on a common carrier frequency.

28. A base station according to claim 27, wherein each frame of the first and second frame series comprises at least one time slot, and wherein a beginning of a frame from the second series of frames is delayed with respect to an end of a preceding frame of the first series of frames by a time interval that is less than the duration of one time slot.

29. A base station according to claim 25, wherein the second range is more distant from the base station than the first range, and wherein the second series of frames is delayed with respect to the first series of frames.

30. A base station according to claim 25:

wherein said means for transmitting second timing information comprises means for transmitting the second timing information in response to movement of the terminal from the first range to a portion of the second range outside of the first range; and wherein said means for transmitting first timing information comprises means for transmitting the first timing information to the terminal in response to movement of the terminal from the second range to a portion of the first range outside of the second range.

31. A wireless communications apparatus, comprising:

a base station operative to transmit first timing information that instructs a first group of terminals to time their transmissions to arrive at a base station in synchronism with a first series of frames, to transmit second timing information that instructs a second group of terminals to time their transmissions to arrive at the base station in synchronism with a second series of frames that is time-offset with respect to the first series of frames, and to receive transmissions from the first and second groups of terminals in synchronism with the respective first and second series of frames, wherein said base station is operative to transmit first timing information to a terminal when the terminal is in a first range with respect to a base station, the first timing information instructing the terminal to time its transmissions to arrive at the base station synchronized to a first series of frames, and to transmit second timing information to the terminal when the terminal is in a second range, the second timing information instructing the terminal to time its transmissions to arrive at the base station synchronized with a second series of frames that is time-offset with respect to the first series of frames, wherein the first and second ranges overlap, and wherein said base station provides hysteresis in instructing the terminal to synchronize its transmissions to one of the first series of frames or the second series of frames when the terminal moves between the first and second ranges.

32. An apparatus according to claim 31, wherein said base station comprises a receiver operative to receive a transmission from a terminal of the first group at the base station on a first carrier frequency in synchronism with the first series of frames and to receive a transmission from a terminal of the second group at the base station on a second carrier frequency in synchronism with the second series of frames.

33. An apparatus according to claim 31, wherein said base station comprises a receiver operative to receive transmissions from a terminal of the first group and from a terminal of the second group at the base station on a common carrier frequency in synchronism with respective ones of the first and second series of frames, wherein the first and second series of frames are multiplexed on the common carrier frequency.

34. An apparatus according to claim 31, wherein said base station comprises:

a propagation delay determiner operative to determine respective propagation delays between respective terminals and the base station; and a timing information determiner responsive to said propagation delay determiner and operative to determine the first and second timing information based on the determined propagation delays.

35. An apparatus according to claim 34, wherein said base station further comprises a receiver operative to receive random access bursts from terminals, and wherein said propagation delay determiner is responsive to said receiver to determine respective propagation delays for respective terminals based on timing of the received random access bursts.

36. An apparatus according to claim 31, wherein the second range is more distant from the base station than the first range, and wherein the second series of frames is delayed with respect to the first series of frames.

37. An apparatus according to claim 31, wherein said base station is operative to transmit a timing advance value to a terminal based on whether the terminal is in the first group of the second group.

38. A base station according to claim 31, wherein the base station transmits the second timing information in response to movement of the terminal from the first range to a portion of the second range outside of the first range, and wherein said base station transmits the first timing information in response to movement of the terminal from the second range to a portion of the first range outside of the second range.

* * * * *

UNITED STATES PATENT AND TRADEMARK OFFICE
CERTIFICATE OF CORRECTION

PATENT NO. : 6,633,559 B1  Page 1 of 1
DATED : October 14, 2003
INVENTOR(S) : Asokan et al.

It is certified that error appears in the above-identified patent and that said Letters Patent is hereby corrected as shown below:

<u>Column 14,</u>
Line 55, change "step-of" to -- step of --
Line 58, change "cach" to -- each --

Signed and Sealed this

Thirteenth Day of April, 2004

JON W. DUDAS
*Acting Director of the United States Patent and Trademark Office*